(12) United States Patent
Yaguchi et al.

(10) Patent No.: US 7,509,060 B2
(45) Date of Patent: Mar. 24, 2009

(54) DENSITY DETERMINATION METHOD, IMAGE FORMING APPARATUS, AND IMAGE PROCESSING SYSTEM

(75) Inventors: Hiroyuki Yaguchi, Yokohama (JP); Akihiro Matsuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 11/376,373

(22) Filed: Mar. 15, 2006

(65) Prior Publication Data

US 2007/0003294 A1    Jan. 4, 2007

(30) Foreign Application Priority Data

Jun. 30, 2005 (JP) ............... 2005-192017

(51) Int. Cl.
*G03G 15/00* (2006.01)
(52) U.S. Cl. ............... 399/15; 399/10; 399/36; 399/49; 399/60; 399/72
(58) Field of Classification Search ............ 399/10, 399/15, 49, 72, 60, 36
See application file for complete search history.

(56) References Cited

U.S. PATENT DOCUMENTS

| | | | |
|---|---|---|---|
| 6,535,307 | B1 | 3/2003 | Allen |
| 2003/0206308 | A1* | 11/2003 | Matsuya ............ 358/1.9 |
| 2004/0114190 | A1 | 6/2004 | Man |
| 2005/0058476 | A1* | 3/2005 | Murakami ............ 399/366 |
| 2007/0097438 | A1* | 5/2007 | Sato ............ 358/3.1 |
| 2008/0025637 | A1* | 1/2008 | Kashiwagi et al. ............ 382/282 |
| 2008/0130942 | A1* | 6/2008 | Kitani ............ 382/100 |
| 2008/0137153 | A1* | 6/2008 | Kunori et al. ............ 358/462 |

FOREIGN PATENT DOCUMENTS

| | | |
|---|---|---|
| JP | 07-160076 A | 6/1995 |
| JP | 2000-196879 A | 7/2000 |
| JP | 2001-197297 A | 7/2001 |
| JP | 2003-324608 A | 11/2003 |
| JP | 2005091730 A | 4/2005 |
| JP | 2005094327 A | 4/2005 |

\* cited by examiner

*Primary Examiner*—David M Gray
*Assistant Examiner*—Ryan D Walsh
(74) *Attorney, Agent, or Firm*—Canon U.S.A. Inc., I.P. Division

(57) ABSTRACT

A density signal value determination method, an image forming apparatus, and an image processing system are configured to automatically and optimally determine the density of a copy-forgery-inhibited pattern image that includes a latent image and a background image. In a density signal value determination method, a test sheet, on which a plurality of latent image patches and a plurality of background image patches are formed, is outputted. Subsequently, the luminance, the density, and the reflection density of each of the patches are obtained from image data obtained by reading this test sheet. Then, an optimal combination of a latent image patch and a background image patch is selected according to the obtained values. Finally, density signal values used to generate the selected patches are set to generate a latent image and a background image.

11 Claims, 35 Drawing Sheets

FIG.11
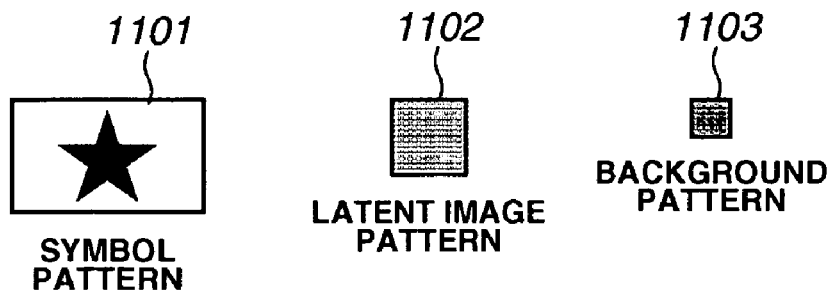
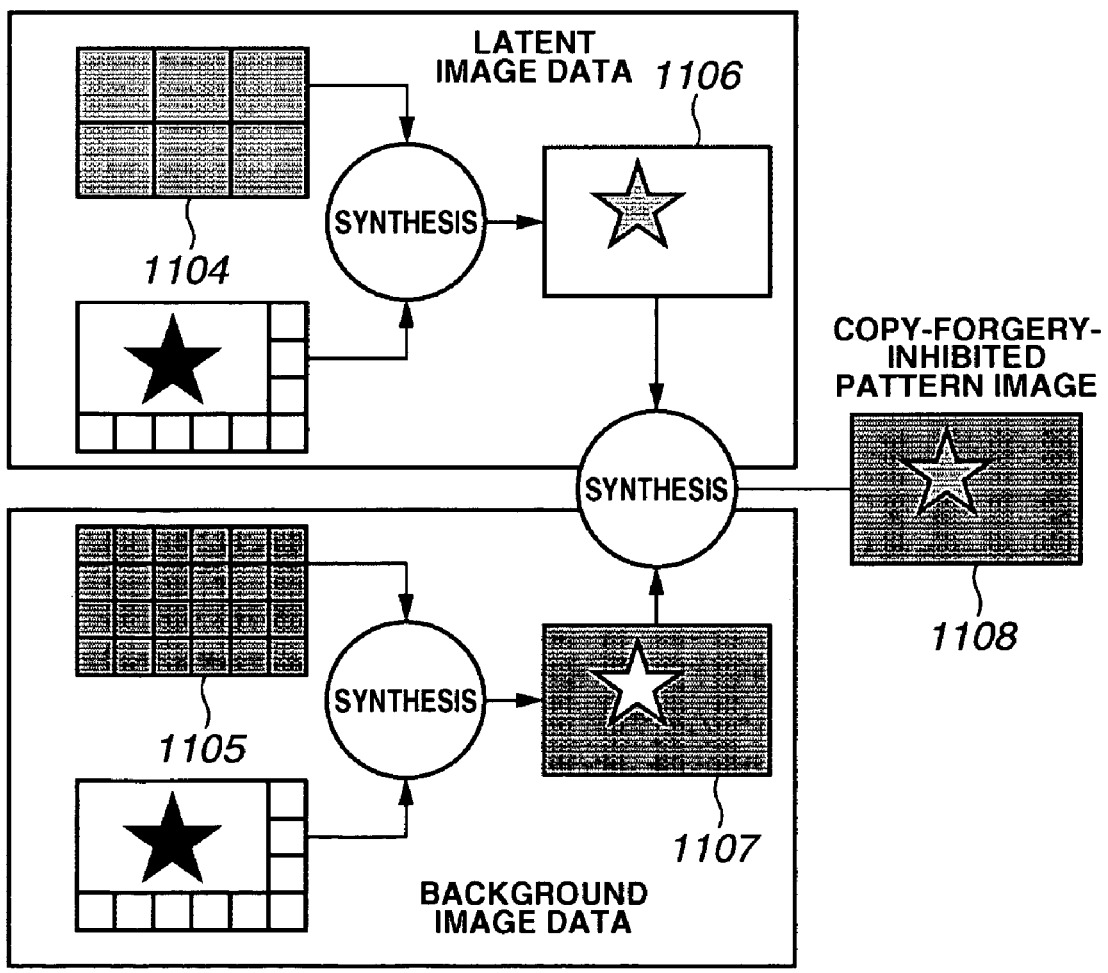

FIG.12

DOT-CONCENTRATED-TYPE DITHER MATRIX

| 6  | 7  | 8  | 9  |
|----|----|----|----|
| 5  | 0  | 1  | 10 |
| 4  | 3  | 2  | 11 |
| 15 | 14 | 13 | 12 |

FIG.13

DOT-DISPERSED-TYPE DITHER MATRIX

| 0  | 8  | 2  | 10 |
|----|----|----|----|
| 12 | 4  | 14 | 6  |
| 3  | 11 | 1  | 9  |
| 15 | 7  | 13 | 5  |

FIG.19

| LATENT IMAGE PATCH ||| BACKGROUND IMAGE PATCH |||
|---|---|---|---|---|---|
| PATCH NO. | DENSITY SIGNAL VALUE | PATCH POSITION | PATCH NO. | DENSITY SIGNAL VALUE | PATCH POSITION |
| 1 | N | (20,5) | 1 | M | (50,5) |
| 2 | N+1 | (20,25) | 2 | M+1 | (50,25) |
| 3 | N+2 | (20,45) | 3 | M+2 | (50,45) |
| 4 | N+3 | (20,65) | 4 | M+3 | (50,65) |
| ⋮ | ⋮ | ⋮ | ⋮ | ⋮ | ⋮ |
| n | N+n-1 | (20,n×20+5) | n | M+n-1 | (50,n×20+5) |

FIG.20

| LATENT IMAGE PATCH | | | BACKGROUND IMAGE PATCH | | |
|---|---|---|---|---|---|
| PATCH NO. | DENSITY SIGNAL VALUE | LUMINANCE VALUE | PATCH NO. | DENSITY SIGNAL VALUE | LUMINANCE VALUE |
| 1 | N | 219 | 1 | M | 216 |
| 2 | N+1 | 216 | 2 | M+1 | 215 |
| 3 | N+2 | 212 | 3 | M+2 | 214 |
| 4 | N+3 | 209 | 4 | M+3 | 213 |
| ⋮ | ⋮ | ⋮ | ⋮ | ⋮ | ⋮ |
| n | N+n-1 | . | n | M+n-1 | . |

FIG.21

| LUMINANCE VALUE | REFLECTION DENSITY VALUE | | | |
|---|---|---|---|---|
| | BLACK | CYAN | MAGENTA | YELLOW |
| 0 | 1.921 | 2.596 | 2.286 | 2.652 |
| 1 | 1.871 | 2.529 | 2.756 | 2.604 |
| 2 | 1.823 | 2.464 | 2.688 | 2.558 |
| 3 | 1.777 | 2.402 | 2.622 | 2.512 |
| 4 | 1.732 | 2.341 | 2.558 | 2.467 |
| 5 | 1.689 | 2.283 | 2.496 | 2.423 |
| 6 | 1.647 | 2.226 | 2.436 | 2.380 |
| 7 | 1.607 | 2.171 | 2.377 | 2.338 |
| 8 | 1.568 | 2.118 | 2.320 | 2.296 |
| 9 | 1.531 | 2.066 | 2.265 | 2.256 |
| ... | ... | ... | ... | ... |
| ... | ... | ... | ... | ... |
| 252 | 0.096 | 0.099 | 0.092 | 0.043 |
| 253 | 0.095 | 0.098 | 0.091 | 0.042 |
| 254 | 0.095 | 0.097 | 0.090 | 0.040 |
| 255 | 0.094 | 0.096 | 0.089 | 0.039 |

FIG.22

| LATENT IMAGE PATCH | | | BACKGROUND IMAGE PATCH | | |
|---|---|---|---|---|---|
| PATCH NO. | DENSITY SIGNAL VALUE | REFLECTION DENSITY VALUE | PATCH NO. | DENSITY SIGNAL VALUE | REFLECTION DENSITY VALUE |
| 1 | N | 0.134 | 1 | M | 0.145 |
| 2 | N+1 | 0.145 | 2 | M+1 | 0.149 |
| 3 | N+2 | 0.160 | 3 | M+2 | 0.153 |
| 4 | N+3 | 0.172 | 4 | M+3 | 0.161 |
| ⋮ | ⋮ | ⋮ | ⋮ | ⋮ | ⋮ |
| n | N+n-1 | . | n | M+n-1 | . |

FIG.28

| LATENT IMAGE PATCH | | | BACKGROUND IMAGE PATCH | | |
|---|---|---|---|---|---|
| PATCH NO. | DENSITY SIGNAL VALUE | REFLECTION DENSITY VALUE | PATCH NO. | DENSITY SIGNAL VALUE | REFLECTION DENSITY VALUE |
| 1 | L | 0.108 | 1 | K | 0.113 |
| 2 | L+8 | 0.157 | 2 | K+8 | 0.138 |
| 3 | L+16 | 0.194 | 3 | K+16 | 0.164 |
| 4 | L+24 | 0.232 | 4 | K+24 | 0.194 |
| ⋮ | ⋮ | ⋮ | ⋮ | ⋮ | ⋮ |
| m | L+8×(m−1) | . | m | K+8×(m−1) | . |

| LATENT IMAGE PATCH | | | BACKGROUND IMAGE PATCH | | |
|---|---|---|---|---|---|
| PATCH NO. | DENSITY SIGNAL VALUE | DENSITY VALUE | PATCH NO. | DENSITY SIGNAL VALUE | DENSITY VALUE |
| 1 | N | 17 | 1 | M | 15 |
| 2 | N+1 | 18 | 2 | M+1 | 20 |
| 3 | N+2 | 19 | 3 | M+2 | 25 |
| 4 | N+3 | 21 | 4 | M+3 | 30 |
| ⋮ | ⋮ | ⋮ | ⋮ | ⋮ | ⋮ |
| n | N+n-1 | · | n | M+n-1 | · |

FIG.33

| | LATENT IMAGE PATCH | | | BACKGROUND IMAGE PATCH | | |
|---|---|---|---|---|---|---|
| PATCH NO. | DENSITY SIGNAL VALUE | DENSITY VALUE | REFLECTION DENSITY VALUE | DENSITY SIGNAL VALUE | DENSITY VALUE | REFLECTION DENSITY VALUE |
| 1 | N | 17 | 0.134 | M | 15 | 0.139 |
| 2 | N+1 | 18 | 0.148 | M+1 | 20 | 0.143 |
| 3 | N+2 | 19 | 0.161 | M+2 | 25 | 0.159 |
| 4 | N+3 | 21 | 0.169 | M+3 | 30 | 0.168 |
| ... | ... | ... | ... | ... | ... | ... |
| n | N+n-1 | . | . | M+n-1 | . | . |

VISUALIZATION

DENSITY DETERMINATION METHOD, IMAGE FORMING APPARATUS, AND IMAGE PROCESSING SYSTEM

BACKGROUND OF THE INVENTION

1. Field of the Invention

The present invention relates to a density signal determination method of determining the density values of a latent image and a background image, which constitute a copy-forgery-inhibited pattern image, and to an image forming apparatus and an image processing system, which are configured to form on a sheet a copy-forgery-inhibited pattern image whose density value is determined.

2. Description of the Related Art

There are special sheets called forgery-inhibited sheets or security paper. In a forgery-inhibited sheet, a string of characters, such as "COPY", is hid so as to be invisible on a casual glance. However, the hid string of characters appears on a copy obtained by copying the forgery-inhibited sheet. Thus, a document produced by using such a forgery-inhibited sheet can easily be discerned from the copy. Also, hesitation about using a copy of the document can be caused.

Forgery-inhibited sheets have the above advantages. Therefore, forgery-inhibited sheets have been utilized to make ledger sheets, resident cards, and so on. However, forgery-inhibited sheets have drawbacks in that they are high in price, as compared with sheets of plain paper, and that only strings of characters hid in the forgery-inhibited sheet at production thereof can appear on a copy thereof.

Under such situations, in recent years, a new technique capable of obtaining advantages similar to those of forgery-inhibited sheets has attracted attention (see Japanese Patent Application Laid-Open No. 2001-197297). This technique of synthesizing pattern-containing-image data from original data and copy-forgery-inhibited pattern (also referred to as copy-inhibited pattern) image data in a printer and of outputting the pattern-containing-image data, which is obtained by this synthesis, to a sheet of standard paper. Incidentally, a string of characters, or the like is hid in this copy-forgery-inhibited pattern image. Thus, the hid string of characters appears on a copy obtained by copying the pattern-containing-image, similarly to the case of using a forgery-inhibited sheet. Additionally, this technique utilizes a sheet of standard paper. Therefore, this technique has an advantage in that an original can be produced inexpensively, as compared with the case of utilizing a forgery-inhibited sheet. Also, according to this technique, new copy-forgery-inhibited pattern image data can be generated every time an original is produced. Thus, this technique has another advantage in that the color of a copy-forgery-inhibited pattern image and a hid string of characters can be freely set.

Meanwhile, this copy-forgery-inhibited pattern image includes an area in which an image "remains (appears)" on the copy, and an area in which an image "disappears" on the copy (or the density of this area is low, as compared with that of the former area). Incidentally, these two areas have substantially the same reflection density on the original. Thus, the human eye cannot recognize that a string of characters, such as "COPY", is hid in the original. Incidentally, the word "remain" means that an image on an original is exactly reproduced on a copy. Further, the word "disappear" means that an image on an original is not reproduced on a copy. Additionally, the reflection density is measured by a reflection densitometer.

Hereinafter, the area, in which an image "remains" on the copy, is referred to as a "latent image part". The area, in which an image "disappears" on the copy (or the density of this area is low, as compared with that of the former area), is referred to as a "background part".

FIG. 38 is a view showing the state of dots in a copy-forgery-inhibited pattern image. In FIG. 38, an area in which dots are arranged in a concentrated manner is a latent image part. An area in which dots are arranged in a dispersed manner is a background part. Dots placed in each of the two areas are formed by an associated one of different halftone dot processes or different dithering processes. For example, the dots of the latent image part are formed by a halftone dot process using a small number of lines. The dots of the background part are formed by a halftone dot process using a large number of lines. Alternatively, the dots of the latent image part are formed by using a dot-concentrated-type dither matrix. The dots of the background part are formed by using a dot-dispersed-type dither matrix.

Meanwhile, the reproduction ability of a copying machine depends on the input resolution and the output resolution of the copying machine. Thus, there is a limit to the reproduction ability of the copying machine. Consequently, in the case where the dots of the latent image part of the copy-forgery-inhibited pattern image are formed to be larger than dots that can be reproduced by a copying machine, and where the dots of the background part of the copy-forgery-inhibited pattern image are formed to be smaller than dots that can be reproduced by the copying machine, generally, the dots of the latent image part on a copy are reproduced, while the dots of the background part are difficult to reproduce. As a result, the latent image part is densely reproduced on the copy in comparison with the background part. Hereinafter, a phenomenon in which a hid string of characters appears on a copy because the latent image part is densely reproduced in comparison with the background part is called "visualization".

FIGS. 39A and 39B are views illustrating this "visualization". FIGS. 39A and 39B conceptually illustrate that concentrated dots (large dots) are reproduced on a copy, and that dispersed dots (small dots) are not exactly reproduced thereon.

Incidentally, the configuration of the copy-forgery-inhibited pattern image is not limited to the aforementioned configuration. It is sufficient to configure the copy-forgery-inhibited pattern image so that human recognizable strings of characters, such as "COPY", symbols, or patterns appear (or are visualized) on a copy. Even in the case where the string of white characters, such as "COPY", on a colored area is shown, this copy-forgery-inhibited pattern image substantially achieves the purpose thereof. In this case, the region of the characters "COPY" is called the "background part".

Meanwhile, as described above, the copy-forgery-inhibited pattern image is formed so that the reflection densities of the latent image part and the background part are substantially equal to each other. For instance, Japanese Patent Application Laid-Open No. 2001-197297 describes that tone correction is performed to make the tone of the latent image part having undergone a halftone dot process substantially equal to that of the background part not having undergone the halftone dot process when being outputted.

Although not describing copy-forgery-inhibited patterns, Japanese Patent No. 3235926 and Japanese Patent Application Laid-Open No. 2000-196879 describe techniques for adjusting the light exposure and a PWM (Pulse Width Modulation) parameter so as to form an image of a small-dot area having a reflection density substantially equal to the reflection density of a large-dot area.

However, the size of dots outputted by an apparatus, for example, MFP (Multi-Function Printer) or a printer, varies under the influence of the environment in which the apparatus is disposed, and the number of years of use of the apparatus. Consequently, the reflection density of the output image is changed. Thus, even in the case where initial setting is performed by a method described in Japanese Patent Application Laid-Open No. 2001-197297 so that the reflection densities of the latent image part and the background part are substantially equal to each other, when the size of outputted small dots is slightly larger (or smaller) than that of small dots outputted the last time, a copy-forgery-inhibited pattern image, in which a background part is darker (or lighter) than a latent image part, is formed. As a result, there is a problem in that the latent image is visible on an original (that is, the concealability of a latent image is low).

Also, when the size of outputted large dots is increased (or decreased), a copy-forgery-inhibited pattern image, in which a latent image part is darker (or lighter) than a latent image part, is formed. As a result, there is the problem in that the latent image is visible on an original.

Also, in the case where both the size of large dots and that of small dots are increased, an original having a darker copy-forgery-inhibited pattern image is produced. Consequently, there are problems in that the legibility of contents, for example, a full name written on the resident card, is lowered, that both of the latent image part and the background part are reproduced on a copy, and that the latent image does not appear on the copy. Conversely, in the case where both the size of large dots and that of small dots are decreased, an original having a lighter copy-forgery-inhibited pattern image is produced. Consequently, there are problems in that neither the latent image part nor the background part is reproduced on a copy, and that the latent image does not appear on the copy.

To summarize the foregoing, there are problems in that a copy-forgery-inhibited pattern image having low concealability of a latent image is formed on an original, that a copy-forgery-inhibited pattern image having low legibility of contents is formed thereon, and that a copy-forgery-inhibited pattern image which is not visualized on a copy is formed thereon.

Meanwhile, Japanese Patent No. 3235926 and Japanese Patent Application Laid-Open No. 2000-196879 disclose the techniques of outputting a test sheet having a plurality of patches and subsequently causing a user to determine patches which appear to have a density equal to that of a predetermined patch. According to the technique disclosed in Japanese Patent No. 3235926, the density is adjusted by determining an optimal exposure based on the result of the user's determination. According to the technique disclosed in Japanese Patent Application Laid-Open No. 2000-196879, the density is adjusted by determining an optimal PWM parameter based on the result of the user's determination.

However, according to the techniques disclosed in Japanese Patent No. 3235926 and Japanese Patent Application Laid-Open No. 2000-196879, the adjustment is performed by a user while visually checking. Thus, exact results cannot be obtained. Also, the techniques impose loads on users and are not very convenient for users.

SUMMARY OF THE INVENTION

An aspect of the present invention is to provide a density determination method configured to automatically and optimally determine the density of a copy-forgery-inhibited pattern image.

Another aspect of the present invention is to provide an image forming apparatus and an image processing system, which are configured to form a copy-forgery-inhibited pattern image, whose density is automatically and optimally determined, on a sheet.

In one aspect of the present invention, a density signal value determination method of determining density signal values of a latent image and a background image constituting a copy-forgery-inhibited pattern image includes a formation step of forming a plurality of latent image patches, which are generated by using a plurality of density signal values, and a plurality of background image patches which are generated by using a plurality of density signal values, on at least one sheet, a luminance information obtaining step of obtaining luminance information representing luminance values of the plurality of latent image patches and the plurality of background image patches in image data obtained by reading the sheet on which the plurality of latent image patches and the plurality of background image patches are formed, and a determination step of determining a density signal value that is used to generate a latent image, and a density signal value that is used to generate a background image, according to the luminance information obtained in the luminance information obtaining step.

According to the invention, the density of a copy-forgery-inhibited pattern image can automatically and optimally be determined. Consequently, a copy-forgery-inhibited pattern image having an appropriate density can easily and surely be generated.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a diagram illustrating a method of generating copy-forgery-inhibited pattern image data.

FIG. 12 is a diagram illustrating a dot-concentrated-type dither matrix.

FIG. 13 is a diagram illustrating a dot-dispersed-type dither matrix.

FIG. 19 is a table illustrating an association among parameters of patches.

FIG. 20 is a table illustrating an association among parameters of patches.

FIG. 21 is a table illustrating a luminance/reflection-density conversion table.

FIG. 22 is a table illustrating an association among parameters of patches.

FIG. 28 is a table illustrating an association among parameters of patches.

FIG. 33 is a table illustrating an association among parameters of patches.

DETAILED DESCRIPTION OF THE EMBODIMENTS

Exemplary embodiments of the invention will be described in detail below with reference to the drawings.

First Embodiment

In the following description, it is assumed that a string of latent characters or latent symbols is set in a latent image part of a copy-forgery-inhibited pattern image, and that an image synthesized from the latent image part and an optional content image is outputted as an original (an original print). Additionally, the following description is made by assuming that the background part is light on a print, as compared with the latent image part, and that thus, the string of latent characters or latent symbols appear on the print.

However, the copy-forgery-inhibited pattern image is not limited thereto. For example, the copy-forgery-inhibited pattern image can be set so that the string of latent characters or latent symbols are presented as white ones on a print by setting the string of latent characters or latent symbols as the background part, as described above, and also setting regions surrounding the background part as the latent image part.

Incidentally, the invention is not confined by the kinds, the generation process, the color, the shape, the size, and the like of the copy-forgery-inhibited pattern image.

Different moirés can be generated in the latent image part and the background part on a copy, respectively, and the reflection density difference can be caused by placing different dot patterns in the latent image part and the background part of an original.

Various possible techniques, such as the formation of a copy-forgery-inhibited pattern image by using a line screen instead of dots, can be substituted.

Figure 1:
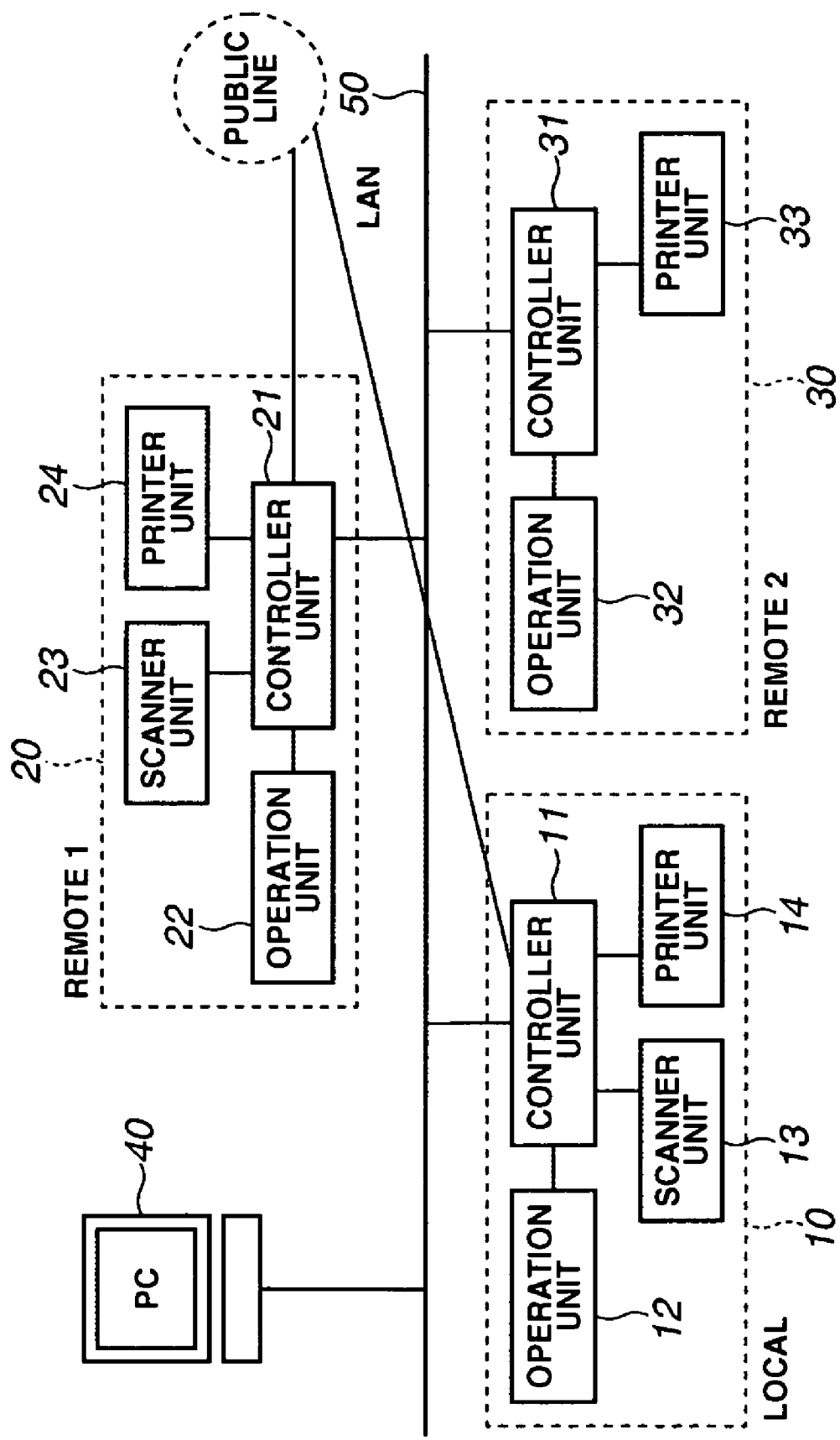
FIG. 1 is a diagram illustrating the entire configuration of an image forming system.

Printing System (FIG. 1)

Next, a first embodiment will be described below in detail by referring to the accompanying drawings. FIG. 1 is a block diagram illustrating the entire configuration of a printing system according to an exemplary embodiment of the invention. In this system, a host computer 40 and three image forming apparatuses 10, 20, and 30 are connected to a LAN (Local Area Network) 50. However, the number of constituents connected in the printing system according to the invention is not limited to that of the aforementioned computer and apparatuses. Although the LAN is employed as a connection method of connecting the constituents in this embodiment, the connection method according to the invention is not limited thereto. For example, optional networks such as a WAN (Wide Area Network using public lines), serial transmission systems such as a USB (Universal Serial Bus), and parallel transmission systems such as Centronics type systems and SCSI (Small Computer System Interface) systems, can be employed.

The host computer (hereunder referred to as the PC) 40 has the functions of a personal computer. This PC 40 can transmit and receive files and e-mails through the LAN 50 or the WAN by using protocols such as FTP (File Transfer Protocol) and SMB (Server Message Block)protocol. The PC 40 is enabled to send printing instructions to the image forming apparatuses 10, 20, and 30 through a printer driver.

The image forming apparatuses 10 and 20 have the same configuration. The image forming apparatus 30 has only a printing function and does not have a scanner unit, while each of the image forming apparatuses 10 and 20 has a scanner unit. Hereinafter, for simplicity of description, the configuration of only the image forming apparatus 10 will be described in detail.

The image forming apparatus 10 includes a scanner unit 13 serving as an image input device, a printer unit 14 serving as an image output device, a controller unit 11 adapted to control an operation of the entire image forming apparatus 10, and an operation unit 12 serving as a user interface UI.

Figure 2:
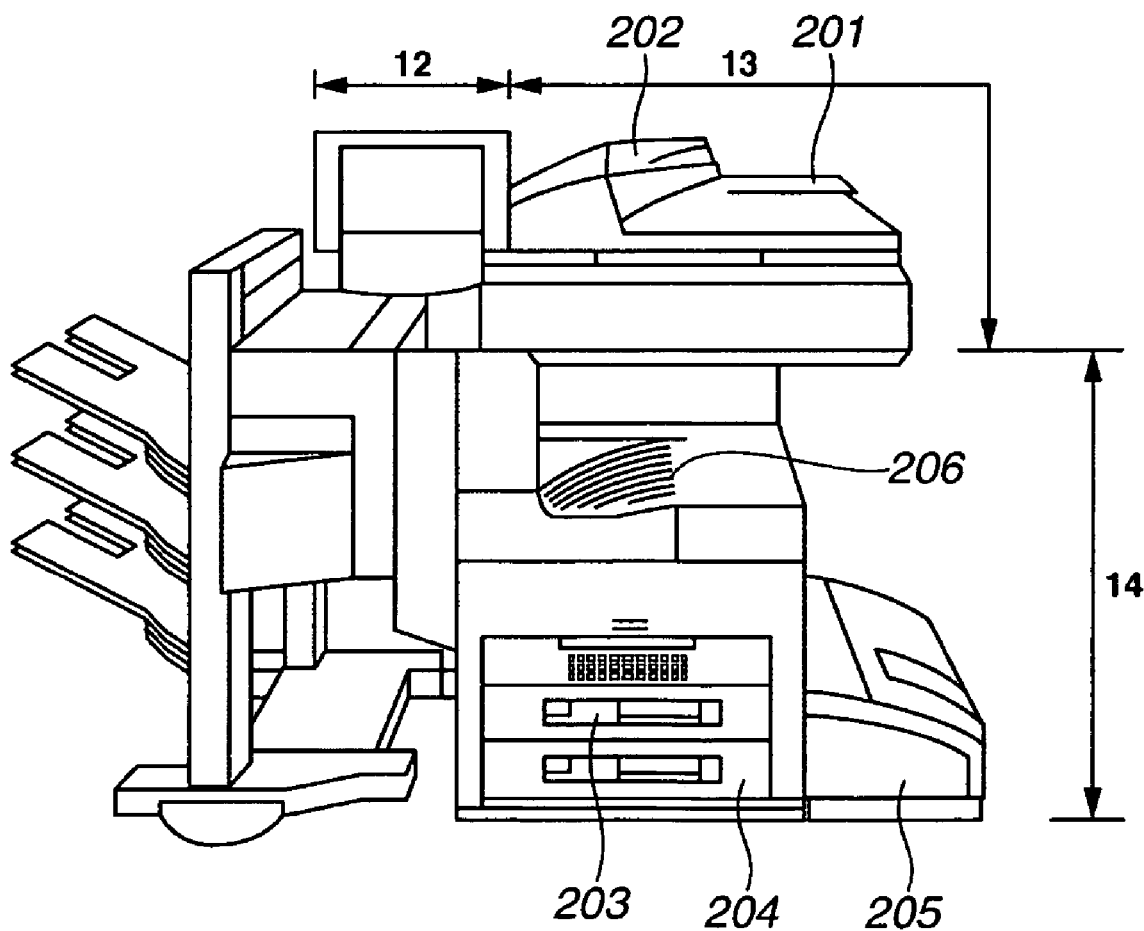
FIG. 2 is an appearance diagram illustrating an input/output device of an image forming apparatus.

Image Forming Apparatus 10 (FIG. 2)

FIG. 2 shows the appearance of the image forming apparatus 10. The scanner unit 13 is adapted to convert image information into electric signals by inputting reflection light, which is obtained by performing an exposure scan operation on an image formed on an original, to a CCD (Charge Coupled Device). The scanner unit 13 further converts the electric signals into luminance signals including red, green, and blue component signals R, G, and B, and outputs the luminance signals to the controller 11.

Incidentally, the original is set on a tray 202 of an original feeder 201. When a user instructs from the operation unit 12 to start reading the original, the controller 11 issues an original reading instruction to the scanner unit 13. When receiving this instruction, the scanner unit 13 feeds sheets of the original one by one from the tray 202 of the original feeder 201 and performs an original reading operation. A method of placing an original on a glass plate (not shown) and scanning the original by moving an exposure unit can be employed as an original reading method instead of the method of automatically feeding the original by using the original feeder 201.

The printer unit 14 is an image forming device adapted to form an image on paper according to image data received from the controller 11. The present embodiment employs an electrophotographic method which uses a photosensitive drum or a photosensitive belt as an image forming method. However, the image forming method employed by the invention is not limited to this electrophotographic method. For example, an inkjet method of discharging ink from a micro-nozzle array and printing on paper can be employed. The printer unit 14 is provided with a plurality of paper cassettes 203, 204, and 205 enabling the selection of one of different paper sizes and one of different orientations. Printed paper is discharged to a paper discharge tray 206.

Figure 3:
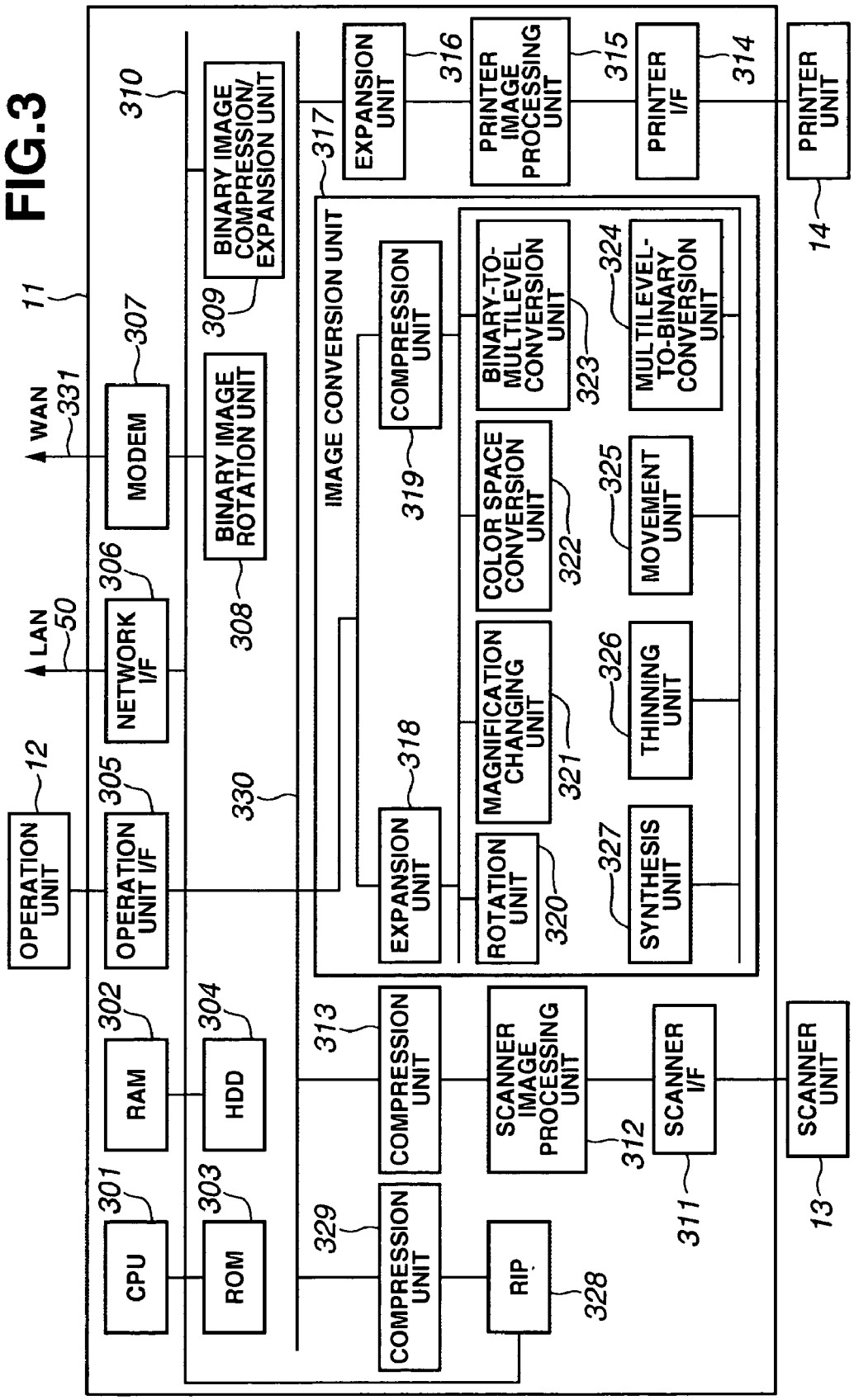
FIG. 3 is a diagram illustrating the entire configuration of the image forming apparatus.

Details of Controller 11 (FIG. 3)

FIG. 3 is a block diagram illustrating the configuration of the controller 11 of the image forming apparatus 10 in more detail.

The controller 11 is electrically connected to the scanner unit 13 and the printer unit 14 and is also connected to the PC 40 and an external device through the LAN 50 and the WAN 331. Consequently, the controller 11 can input and output image data and device information.

A CPU (Central Processing Unit) 301 is adapted to provide centralized control access to various kinds of devices, which are being connected thereto, according to control programs stored in a ROM (Read-Only Memory) 303, and also adapted to provide supervisory control of various processes performed in the controller. A RAM 302 is a system work memory used for an operation of the CPU 301, and is also used to temporarily store image data. This RAM 302 includes an SRAM, which is adapted to hold stored data after the power is turned off, and a DRAM that is adapted to delete stored data after the power is turned off. The ROM 303 stores a boot program for booting the apparatus. An HDD 304 is a hard disk and can store system software and image data.

An operation unit I/F 305 is an interface unit used to connect a system bus 310 to the operation unit 12. This operation unit I/F 305 is adapted to receive image data, which is used to display an image in the operation unit 12, from a system bus 310 and to output the image data to the operation unit 12 and is also adapted to output information, which is inputted from the operation unit 12, to the system bus 310.

A network I/F 306 is connected to the LAN 50 and to the systembus 310 and is adapted to input and output information. A modem 307 is connected to the WAN 331 and to the system bus 310. A binary image rotation unit 308 is adapted to convert the direction of image data before transmission. A binary image compression/expansion unit 309 is adapted to convert the resolution of image data, which is obtained before transmission, to a predetermined resolution or to a resolution fitted to the ability of a destination. When the compression and the expansion are performed, methods such as JBIG (Joint Bi-level Image Experts Group) method, MMR (Modified Modified Read data compression) method, MR (Modified READ coding) method, and MH (Modified Huffman coding) method, are employed. An image bus 330 is a transmission path used to exchange image data, and is constituted by a PCI (Peripheral Component Interconnect) bus or an IEEE (Institute of Electrical and Electronic Engineers) 1394 bus.

A scanner image processing unit 312 is adapted to perform correction, processing, and editing on image data received from the scanner unit 13 through a scanner I/F 311. The scanner image processing unit 312 determines which of a color original, a monochrome original, a text original, and a photo original the received image data is. Then, the result of the determination is caused to accompany the image data. Such accompanying information is called "image area data". Processes performed in this scanner image processing unit 312 are described below in detail.

Figure 4:
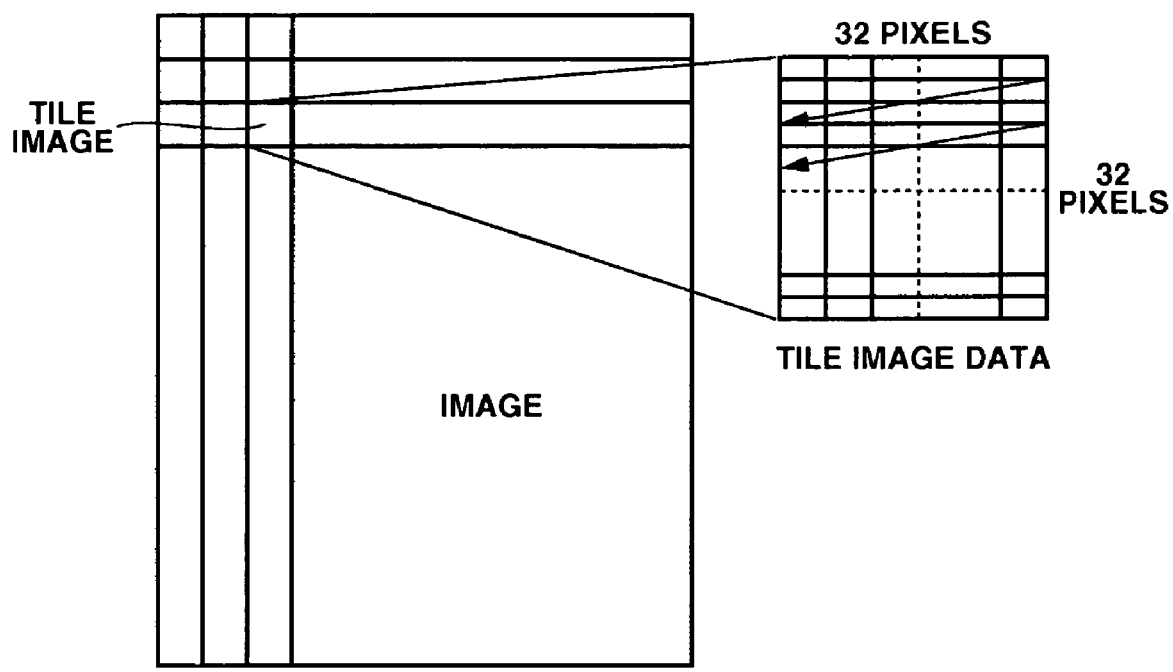
FIG. 4 is a diagram conceptually illustrating tile data.

A compression unit 313 is adapted to receive image data and to divide this image data into units of blocks each consisting of 32 pixels×32 pixels. This image data consisting of 32 pixels×32 pixels is called "tile data". FIG. 4 conceptually illustrates this tile data. A region corresponding to this tile data in an original (that is, a paper medium before being read) is called a "tile image". Average luminance information representing the average luminance of each block consisting of 32 pixels×32 pixels and coordinate positions of tile images are added to tile data as header information. The compression unit 313 compresses image data including a plurality of tile data. The expansion unit 316 expands image data including a plurality of tile data and then rasterizes the expanded data. Subsequently, the expansion unit 316 sends the rasterized data to a printer image processing unit 315.

The printer image processing unit 315 receives the image data from the expansion unit 316 and performs image processing on the image data by referring to the image area data accompanying the image data. The image data having undergone the image processing is outputted to the printer unit 14 through a printer I/F 314. Processes performed in this printer image processing unit 315 are described later in detail.

An image conversion unit 317 is adapted to perform a predetermined conversion process on image data. The image conversion unit 317 unit includes the following processing units.

An expansion unit 318 expands the received image data. A compression unit 319 compresses the received image data. A rotation unit 320 rotates the received image data. A magnification changing unit 321 performs a resolution conversion process (for example, from 600 dpi to 200 dpi) on the received image data. A color space conversion unit 322 can perform a known ground color removing process using a matrix or a table, a known logarithmic conversion process (RGB to CMY), and a known output color correction process (CMY to CMYK). A binary-to-multilevel conversion unit 323 converts the received binary image data to 256-level image data. Conversely, a multilevel-to-binary conversion unit 324 converts the received 256-level image data to binary image data by using a technique such as an error diffusion process.

A synthesis unit 327 synthesizes one image data from the received two image data. When the image data is synthesized from the two image data, a method of setting an average value of the luminance values of pixels of the two image data, from which the image data is synthesized, to be a synthesized luminance value of each pixel of the synthesized image data or a method of setting the luminance value of a lighter pixel of associated pixels of the two images to be the luminance value of an associated pixel of the synthesized image is employed. Alternatively, a method of setting the luminance value of a darker pixel of associated pixels of the two images to be the luminance value of an associated pixel of the synthesized image can be utilized. Alternatively, a method of determining the luminance value of each pixel of the synthesized image to be a logical sum, a logical product, or an exclusive OR of the associated pixels of the two image data, from which the image data is synthesized, can be employed. All of these synthesis methods are known per se. A thinning unit 326 performs resolution conversion by thinning pixels from pixels of the received image data. Thus, the thinning unit 326 generates image data having pixels of the number that is ½, ¼, ⅛ or the like of the number of pixels represented by the received image data. A movement unit 325 adds a margin to the image represented by the received image data or removes a margin from the image represented by the received image data.

A raster image processor (RIP) 328 is adapted to receive intermediate data generated according to page description language (PDL) record data transmitted from the PC 40 and is also adapted to generate (multilevel) bitmap data.

Figure 5:
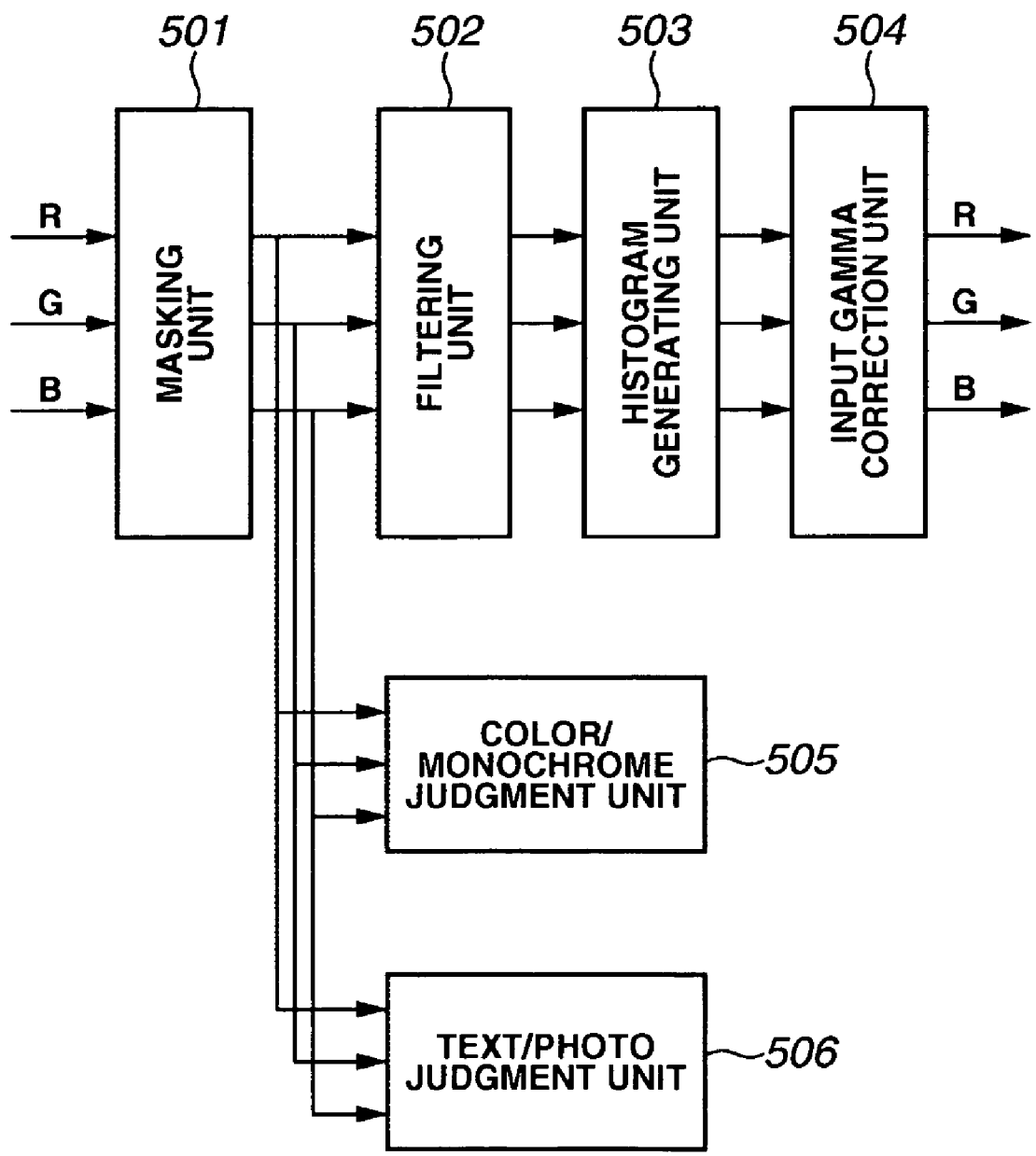
FIG. 5 is a block diagram illustrating a scanner image processing unit.

Details of Scanner Image Processing Unit 312 (FIG. 5).

FIG. 5 shows the internal configuration of the scanner image processing unit 312.

The scanner image processing unit 312 receives image data represented by 8-bit R, G, and B luminance signals. Such luminance signals are converted by a masking unit 501 into standard luminance signals that do not depend upon the filter colors on the CCD.

A filtering unit 502 optionally corrects the spatial frequencies of the received image data. The filtering unit 502 performs a computation operation on the received image data by using, for example, a 7×7 matrix. Meanwhile, in a copying machine and a multifunction machine, a text mode, a photo mode, or a text/photo mode can be selected as a copy mode by depressing a tab 704 shown in FIG. 7. When the text mode is selected by a user, the filtering unit 502 performs a text filter on the entire image data. When the photo mode is selected, the filtering unit 502 performs a photo filter on the entire image data. When the text/photo mode is selected, the filtering unit 502 adaptively changes the filters corresponding to each pixel according to a text/photo determination signal (a part of image area data (to be described later)). That is, the filtering unit 502 determines which of the photo filter and the text filter is applied to each pixel. Incidentally, a coefficient is set in the photo filter so that only high frequency components are smoothed, with a view to obscuring the roughness of the image. Another coefficient is set in the text filter to apply slightly stronger edge enhancement to each pixel, with a view to enhancing the sharpness of the text.

A histogram generating unit 503 performs sampling of luminance data of pixels, which constitutes the received image data. More particularly, the sampling of luminance data included in a rectangular area, which is defined by a start point and an end point in each of a main scanning direction and an auxiliary scanning direction, is performed with a constant pitch in each of the main scanning direction and the auxiliary scanning direction. Then, a histogram is generated according to results of the sampling. The generated histogram data is used to presume a ground level when the ground color removing process is performed. An input gamma correction unit 504 converts the generated histogram data into luminance data having a nonlinear characteristic by utilizing a table.

A color/monochrome judgment unit 505 determines which of a chromatic color and an achromatic color each pixel of the image represented by the received image data has. Data represented by a color/monochrome judgment signal (a part of the image area data) representing the result of this judgment is caused to accompany the image data. A text/photo judgment unit 506 determines whether each pixel of the image represented by the received image data constitutes a text or an element (for instance, a photo) other than texts. Then, data represented by a text/photo judgment signal (a part of the image area data) representing the result of this judgment is caused to accompany the image data.

Figure 6:
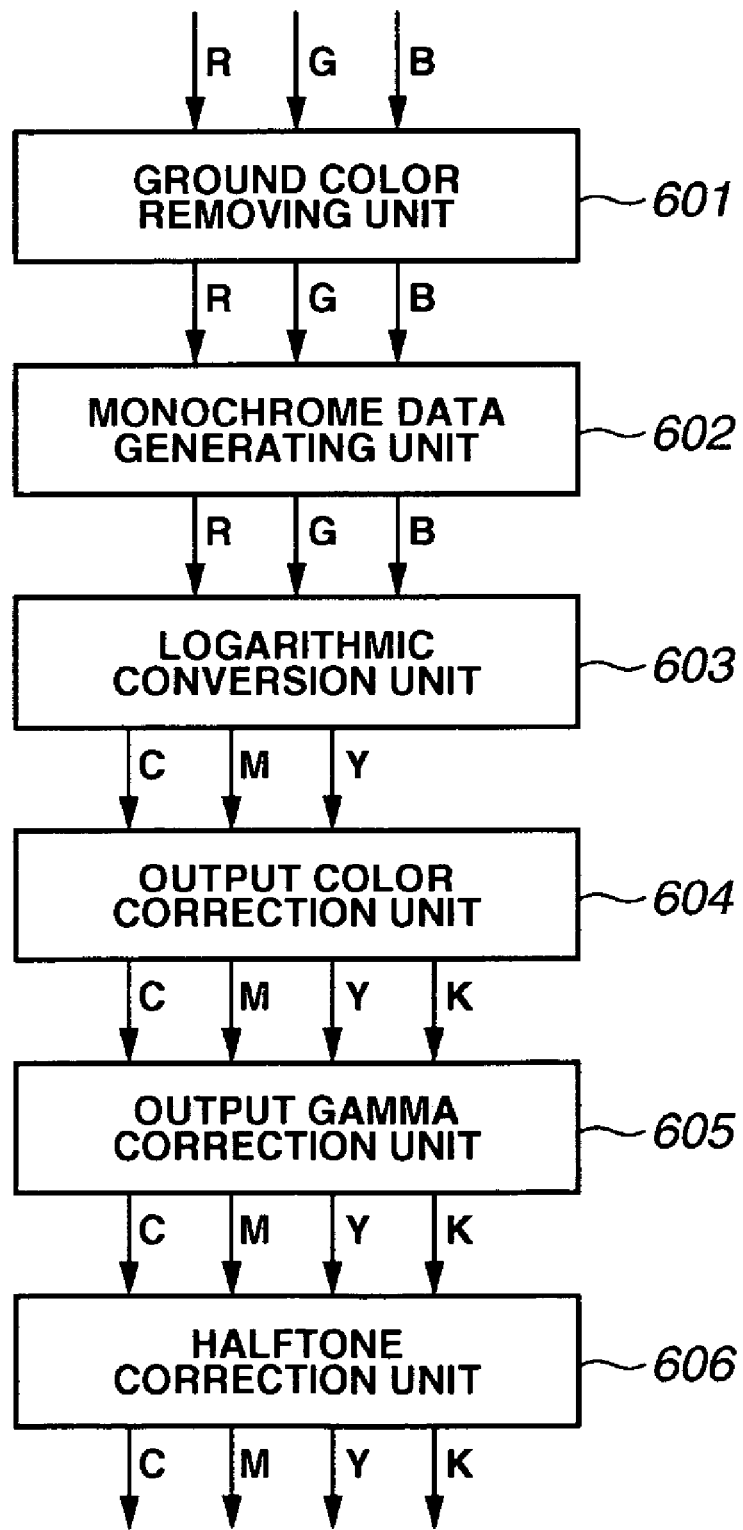
FIG. 6 is a block diagram illustrating a printer image processing unit.

Details of Printer Image Processing Unit 315 (FIG. 6)

FIG. 6 shows the flow of a process performed in the printer image processing unit 315.

A ground color removing unit 601 removes a ground color represented by the image data by using the histogram generated by the scanner image processing unit 312. A monochrome data generating unit 602 converts color data into monochrome data. A logarithmic conversion unit 603 performs luminance-density conversion. The logarithmic conversion unit 603 converts image data, which is represented by R, G, and B signals, into image data represented by C, M, and Y signals. An output color correction unit 604 performs output color correction. For instance, the output color correction unit 604 converts input image data, which is represented by C, M, and Y signals, to image data, which is represented by C, M, Y, and K signals, by using a table or a matrix. An output gamma correction unit 605 performs correction so that a signal value inputted to the output gamma correction unit 605 is proportional to the reflection density value obtained after a copy is outputted. A halftone correction unit 606 performs optional halftone correction according to the number of tone levels of data which the printer unit can output. The halftone correction unit 606 generates binary image data, 32-level image data, or the like from received hightone image data.

Incidentally, each of the scanner image processing unit 312 and the printer image processing unit 315 can output the received image data without performing the processes thereon. To pass data through a processing unit without performing any processing thereon is referred to as "to make data pass through a processing unit". Thus, the description of the controller 11 is completed.

Copying Operation and PDL Printing Operation

Next, a copying operation and a PDL printing operation are described below by referring to FIGS. 2, 5 and 6.

First, a copying operation will be described below. Image data obtained by reading an original by the scanner unit 13 is fed to the scanner image processing unit 312 through the scanner I/F 311. The scanner image processing unit 312 performs the process, which is shown in FIG. 5, on this image data and generates new image data and image area data. Further, this image area data is caused to accompany the image data. Subsequently, the compression unit 313 divides this image data into units of blocks consisting of 32 pixels×32 pixels to thereby generate tile data. Also, the compression unit 313 compresses the image data including a plurality of tile data. The image data compressed by the compression unit 313 is sent to and is stored in the RAM 302. Incidentally, this image data is sent to the image conversion unit 317 when needed. Then, image processing is performed on the sent image data in the image conversion unit 317. Thereafter, the image data is fed to the RAM 302 again, and is stored therein. Subsequently, the image data stored in the RAM 302 is sent to the expansion unit 316. The expansion unit 316 expands this image data. Further, the expansion unit 316 rasterizes the image data including a plurality of tile data after the expansion. The rasterized image data is sent to the printer image processing unit 315. The printer image processing unit 315 edits image data according to the image area data accompanying the image data. This process is illustrated in FIG. 6. Upon completion of editing the image data in the printer image processing unit 315, this image data is sent to the printer unit 14 through the printer I/F 314. Finally, the printer unit 14 forms an image on output paper.

Incidentally, an editing method performed in each of the units in the scanner image processing unit 312 and the printer image processing unit 315, that is, in each of the units shown in FIGS. 5 and 6, is changed in response to the switching of a register. This switching of the register is performed according to the image area data and the setting information representing the setting performed by a user, which is sent from the operation unit 12. Although omitted in the foregoing description, operations of storing image data in the ROM 303 and the HDD 304 and operations of reading the data stored in the ROM 303 and the HDD 304 can be performed when needed.

Next, the PDL operation will be described below. PDL data sent from the PC 40 through the LAN 50 is fed to the RAM 302 through the network I/F 306. Intermediate data generated by interpreting the PDL data stored in the RAM 302 is sent to the RIP 328. The RIP 328 renders the intermediate data and generates image data of the raster form. The generated image data of the raster form is sent to the compression unit 329. The compression unit 329 compresses the image data after dividing the image data into units of blocks. The compressed image data is sent to the RAM 302. The image area data corresponding to object data (that is, data indicating which of the text image and the photo image this image data is) included in the PDL data is caused to accompany this image data. Meanwhile, in the case where the printing of the PDL data is instructed, this data is sent to the printer unit 14, so that an image is formed on output paper. This operation is similar to the copying operation. Therefore, the description thereof is omitted.

Next, a method of setting a copy-forgery-inhibited pattern will be described below.

Operation Screen.

FIGS. 7, 8, 9 and 10 show an initial screen and operation screens displayed when a copy-forgery-inhibited pattern is set.

Figure 7:
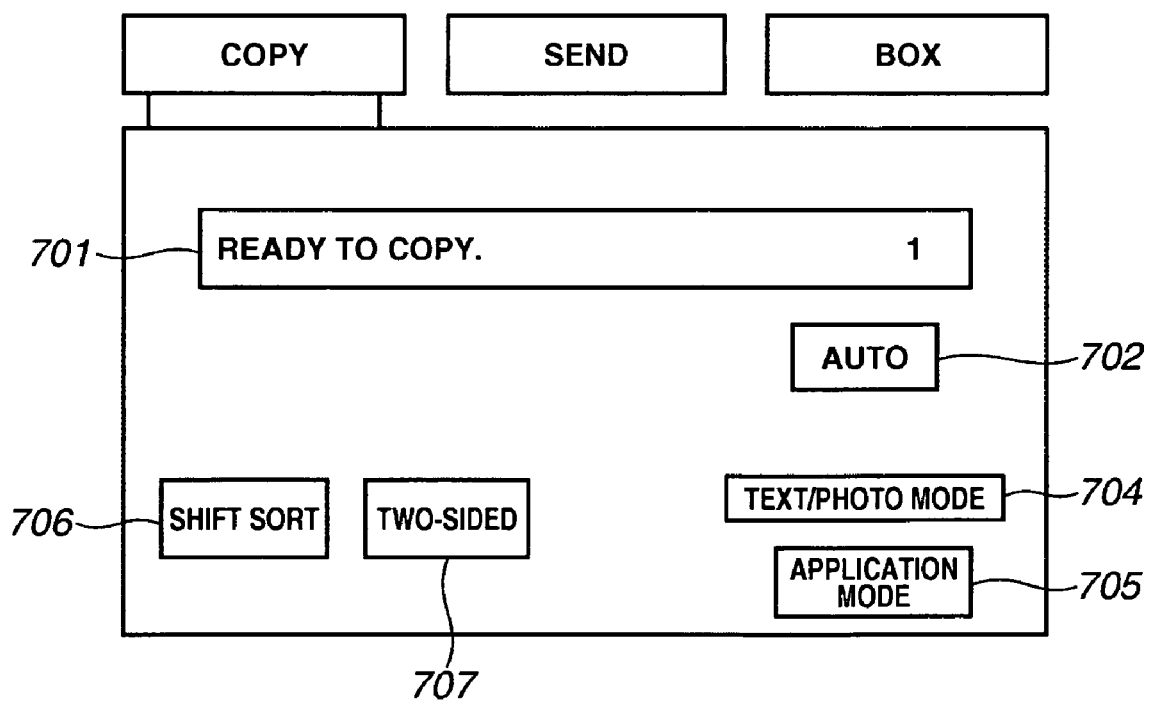
FIG. 7 is an explanatory diagram illustrating a copy screen of an operation unit.

FIG. 7 shows an initial screen displayed in the image forming apparatus 10. A region 701 indicates whether the image forming apparatus 10 is in a state in which a copying operation can be performed, and also indicates the set number of copies. An original selection tab 704 is used to select the type of an original. When this tab 704 is depressed, a pop-up menu for selecting one of three kinds of modes, that is, a text mode, a photo mode, and a text/photo mode is displayed. A finishing tab 706 is used to perform setting concerning various kinds of finishing. A two-sided setting tab 707 is used to perform setting two-sided reading and two-sided printing. A read mode tab 702 is used to select an original read mode. When this tab 702 is depressed, a pop-up menu for selecting one of three kinds of read modes, that is, color/black/automatic (ACS) modes. Incidentally, when the color mode is selected, color-copying is performed. When the black mode is selected, monochrome-copying is performed. When the ACS mode is selected, the copy mode is determined according to the monochrome/color judgment signal.

Figure 8:
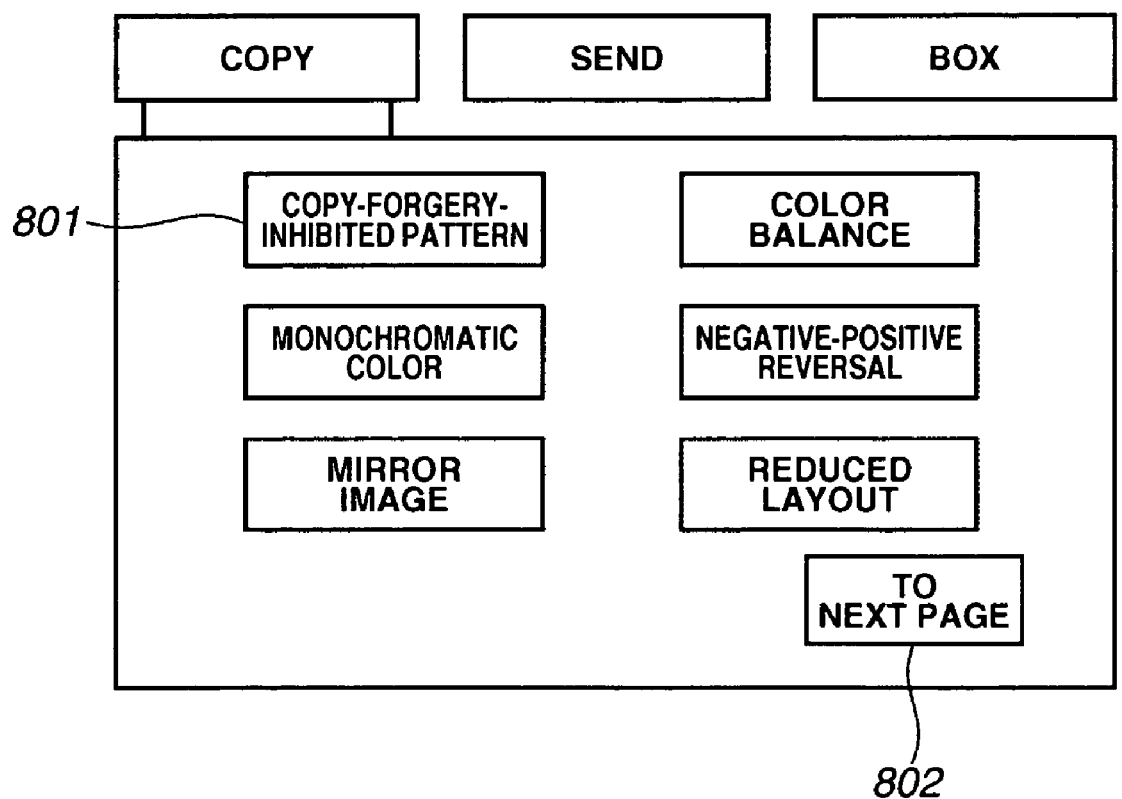
FIG. 8 is an explanatory diagram illustrating a copy-forgery-inhibited-pattern setting screen of the operation unit.

FIG. 8 shows a screen displayed when an application mode tab 705 shown in FIG. 7 is depressed. A user can perform setting concerning reduction layout, color balance, a copy-forgery-inhibited pattern, and the like on this screen.

Figure 9:
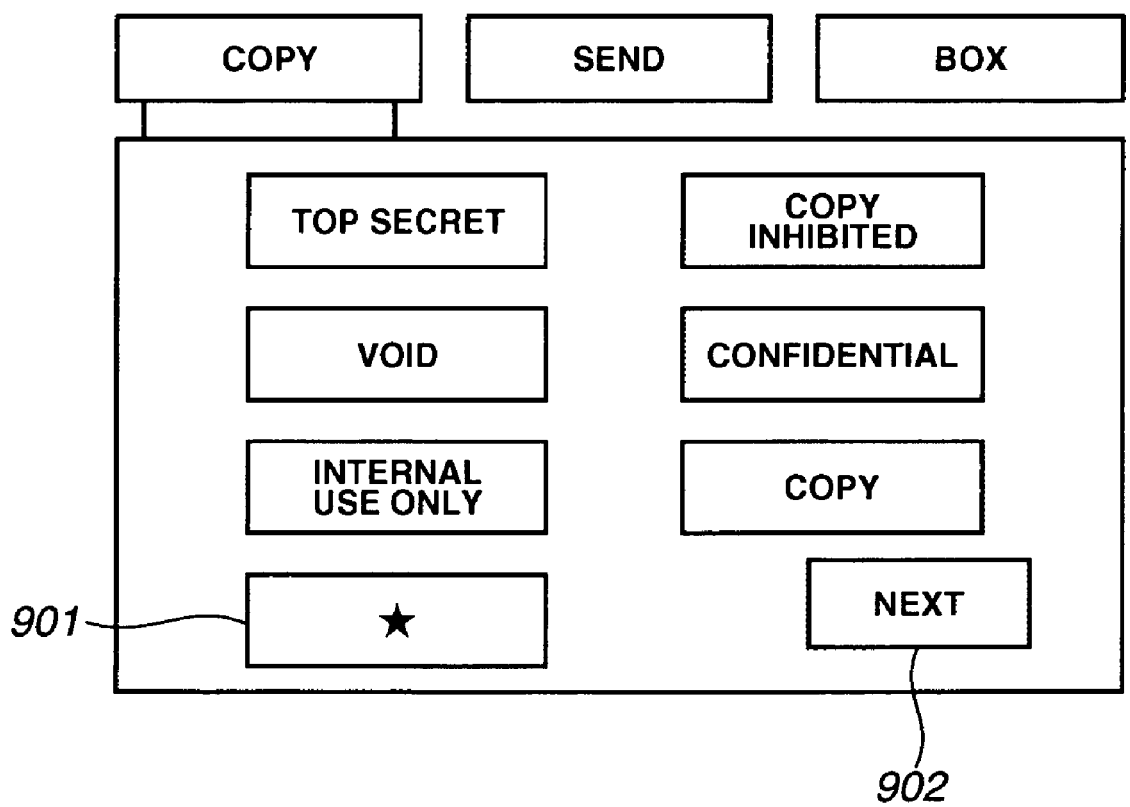
FIG. 9 is an explanatory diagram illustrating another copy-forgery-inhibited-pattern setting screen of the operation unit.

FIG. 9 shows a screen displayed when a copy-forgery-inhibited pattern tab 801 shown in FIG. 8 is depressed. A user can set character string information (TOP SECRET, COPY INHIBITED, VOID, CONFIDENTIAL, INTERNAL USE ONLY, COPY) and symbol information (*) on this screen as latent images. For instance, when the symbol information (*) is set as a latent image, it is sufficient to depress a Next tab 902 after the symbol information tab 901 is depressed.

Figure 10:
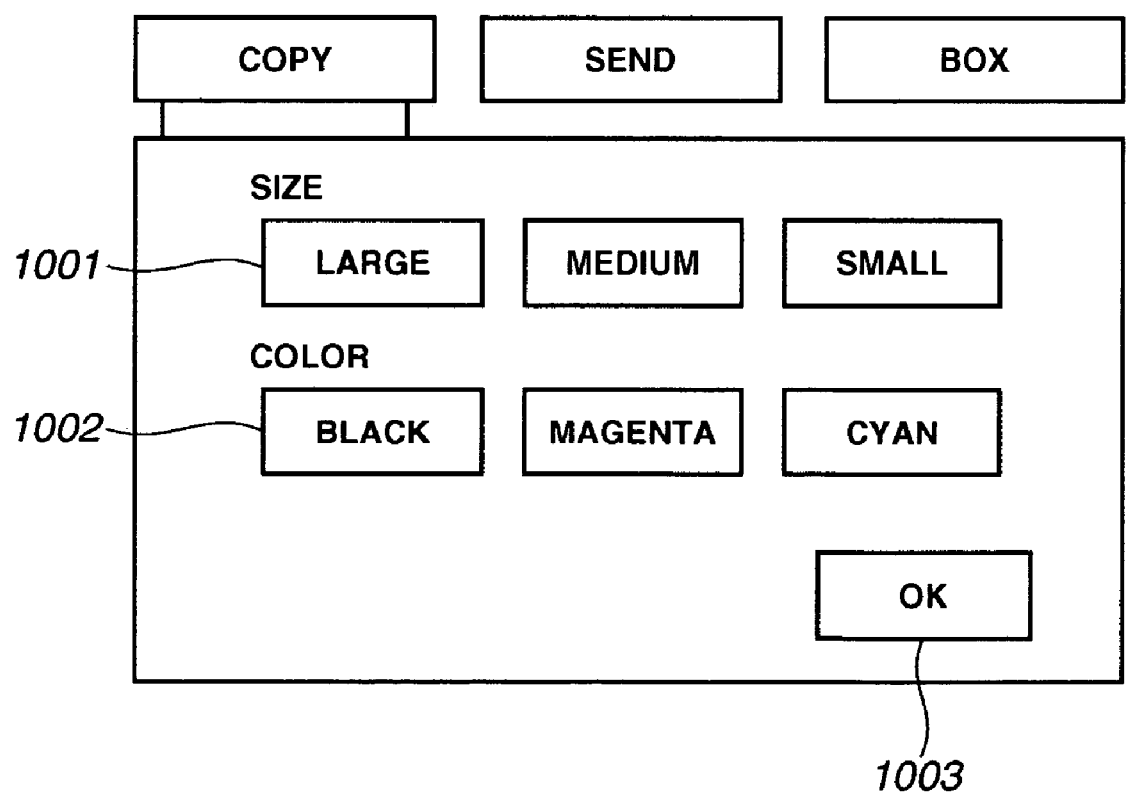
FIG. 10 is an explanatory diagram illustrating another copy-forgery-inhibited-pattern setting screen of the operation unit.

FIG. 10 shows a screen displayed when the Next tab 902 shown in FIG. 9 is depressed. A user can set the font size and the color of the latent image on this screen. Options for the font size are LARGE, MEDIUM, and SMALL (1001), while options for the color are BLACK, MAGENTA, and CYAN (1002). The setting of the copy-forgery-inhibited pattern is completed when an OK tab 1003 is depressed upon completion of setting the font size and the color.

Formation of Image from Pattern-Containing Image Data

Hereinafter, processes of synthesizing image data from original image data, which is obtained by reading an original, and copy-forgery-inhibited pattern image data and of forming an image from the synthesized image data on output paper are described. Incidentally, when each of the processes is performed, the CPU 301 supervisorily controls the apparatus. The RAM 302 functions as a main memory and a work area for the CPU 301.

When an instruction to add a copy-forgery-inhibited pattern to an original is issued through the operation screens shown in FIGS. 8 to 10, the scanner unit 13 starts reading the original. Original image data generated by this reading is sent to the scanner image processing unit 312, whereupon a predetermined image processing operation is performed. The original image data having undergone the predetermined image processing operation is sent to the compression unit 313 and is compressed therein. The compressed original image data is sent together with the image area data accompanied thereto to the RAM 302. Incidentally, the original image data stored in the RAM 302 includes a plurality of tile data. This process is the same as the process described in the foregoing description of the "Copying Operation".

Subsequently, the original image data stored in the RAM 302 is sent to the expansion unit 318. Then, the expansion unit 318 expands this original image data. The expanded original image data is sent to the color space conversion unit 322. The color space conversion unit 322 performs a ground color removing process, a monochrome data generating process, a logarithmic conversion process, and an output color correction process. These processes correspond to those performed in the ground color removing unit 601, the monochrome data generating unit 602, the logarithmic conversion unit 603, and the output color correction unit 604 shown in FIG. 6, respectively. The original image data having undergone these processes is sent to the compression unit 319. Then, the compression unit 319 compresses the original image data on which the image processing is performed in the color space conversion unit 322. The compressed original image data is sent to the RAM 302 and is stored therein. On the other hand, copy-forgery-inhibited pattern image data generated in a process, which will be described later, is stored in the RAM 302 as uncompressed data. The copy-forgery-inhibited pattern image data stored in the RAM 302 includes a plurality of tile data, similarly to the original image data.

Subsequently, the original image data stored in the RAM 302 is sent to the expansion unit 318. The expansion unit 318 expands this original image data. The expanded original image data is sent to the synthesis unit 327. Similarly, the copy-forgery-inhibited pattern image data is sent to the synthesis unit 327 through the expansion unit 318. However, the expansion unit 318 does not expand the copy-forgery-inhibited pattern image data, because the copy-forgery-inhibited pattern image data has not been compressed. The synthesis unit 327 synthesizes image data from these two data, that is, the original image data and the copy-forgery-inhibited pattern image data. Because each of the original image data and the copy-forgery-inhibited pattern image data includes a plurality of tile data, the synthesized image data includes a plurality of tile data. The synthesized image data is sent to the compression unit 319. Then, the compression unit 319 compresses the synthesized image data. Subsequently, the synthesized image data having undergone the compression is set to the RAM 302 and is stored therein. Then, the synthesized image data stored in the RAM 302 is sent to the expansion unit 316. The expansion unit 316 expands this synthesized image data. Also, the synthesized image data having undergone the expansion is rasterized. Then, the synthesized image data having been rasterized is sent to the printer image processing unit 315.

Subsequently, the printer image processing unit 315 performs output gamma correction and halftone correction. These processes correspond to the processes performed by the output gamma correction unit 605 and the halftone correction unit 606 shown in FIG. 6, respectively. However, the ground color removing process, the monochrome data generating process, the logarithm conversion process, and the output color correction process are not performed. These processes correspond to the processes performed in the ground color removing unit 601, the monochrome data generating unit 602, the logarithmic conversion unit 603, and the output color correction unit 604, respectively. This is because collapse of the copy-forgery-inhibited pattern image is prevented by performing these processes. Incidentally, as described above, these processes are preliminarily performed on the original image data in the color space conversion unit 322.

The synthesized image data having undergone the aforementioned processes in the printer image processing unit 315 is sent to the printer unit 14 through the printer I/F 314. The printer unit 14 forms an image on output paper from this synthesized image data. That is the procedure for forming a pattern-containing image (the synthesized image).

Although omitted in the foregoing description, when needed, image data can be stored in the ROM 303 and the HDD 304, and the image data stored in the ROM 303 and the HDD 304 can be read.

Flow of Process of Generating Copy-Forgery-Inhibited Pattern Image Data (FIG. 11)

Next, the flow of the process of generating copy-forgery-inhibited pattern image data will be described by referring to FIG. 11.

First, bitmap data is generated according to information (TOP SECRET, COPY INHIBITED, symbol information and the like) on a latent image designated by a user. Symbol pattern 1101 conceptually represents bitmap data generated according to the symbol information.

Subsequently, a latent image pattern 1102 and a background pattern 1103, which represent bitmap data, are generated by performing dither processing.

Figure 14:
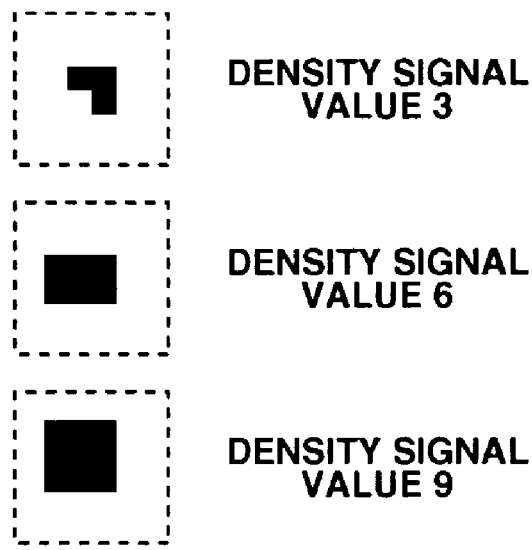
FIG. 14 is a diagram illustrating a concentrated type dither pattern.
Figure 15:
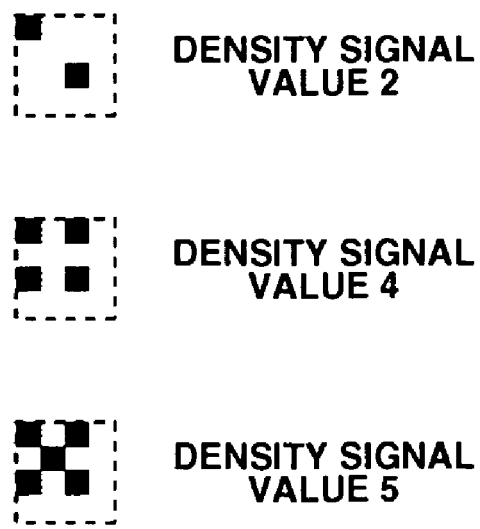
FIG. 15 is a diagram illustrating a dispersed type dither pattern.

Incidentally, dither processing, which is a known technique, is described below in a case where both the dot-concentrated-type dither matrix and the dot-dispersed-type dither matrix are 4×4 matrixes (FIGS. 12 and 13), by way of example, by referring to FIGS. 12 to 15. FIG. 14 shows a dot pattern generated by applying density signal values 3, 6, and 9 to the dot-concentrated-type dither matrix. Incidentally, the comparison between FIGS. 12 and 14 reveals that a dot is an on-state at each of pixels at which the numerical values in the dot-concentrated-type dither matrix (FIG. 12) are less than the density signal value. Similarly, FIG. 15 shows a dot pattern generated by applying density signal values 2, 4, and 5 to the dot-dispersed-type dither matrix. Incidentally, the comparison between FIGS. 14 and 15 reveals that the dot pattern shown in FIG. 14 is of the dot-concentrated-type, and that the dot pattern shown in FIG. 15 is of the dot-dispersed-type.

Thus, the description of the dither processing is completed. The subject of the description is returned to the process of generating a latent image pattern 1102 and a background pattern 1103.

A dither matrix used to generate a latent image part (hereunder referred to as a latent image matrix) and density signal values used to generate the latent image part, which are applied to the latent image matrix, are preliminarily stored in the HDD 304. Also, a dither matrix used to generate a background part (hereunder referred to as a background matrix) and density signal values used to generate the background part, which are applied to the background matrix, are preliminarily stored therein.

When the latent image pattern 1102 is generated, data representing this latent image matrix and the density signal values used to generate the latent image part are read from the HDD 304. Then, the read density signal values used to generate the latent image part are applied to the latent image matrix. Then, the latent image pattern 1102 is generated. Similarly, the background pattern 1103 is generated.

Subsequently, a pattern (hereunder referred to as a latent image repetition pattern), in which the latent image pattern 1102 is repeated a predetermined number of times, and a pattern (hereunder referred to as a background repetition pattern), in which the background pattern 1103 is repeated a predetermined number of times, are generated. Subsequently, latent image data 1106 is generated from this latent image repetition pattern 1104 and the symbol pattern 1101. Similarly, background image data 1107 is generated. Then, copy-forgery-inhibited pattern image data 1108 is generated by being synthesized from the latent image data 1106 and the background image data 1107. The copy-forgery-inhibited pattern image data 1108 generated by the aforementioned process is binary bitmap data. Incidentally, color information representing one of C, M, and K signals is caused to accompany this bitmap data. This color information can be determined according to either the user setting or color information accompanying the original image data.

As described above, this embodiment generates the copy-forgery-inhibited pattern image data by utilizing dither processing. However, the method utilized by the present invention is not limited to the dither processing. For instance, an error diffusion method or an average density method can be utilized to generate a background pattern.

Adjustment of Density of Copy-Forgery-Inhibited Pattern Image

The reflection density of a copy-forgery-inhibited pattern image on an original depends upon the density signal values used in the aforementioned generation of the copy-forgery-inhibited pattern image. That is, the reflection density of the latent image part increases as the density signal value used to generate the latent image part increases (a printed image of the latent image having a high density value is generated). Also, the reflection density of the background part increases as the density signal value used to generate the background part increases (a printed image of the background having a high density value is generated).

Meanwhile, as described above, it is necessary to form a copy-forgery-inhibited pattern image so that the deflection densities of the latent image part and the background part are nearly equal to each other on an output material. However, actually, the reflection density of an output image changes due to external factors such as the properties of the image forming process, change in environment and secular variation. Thus, it is very difficult to adjust the reflection densities of the latent image part and the background part so that the latent image part and the background part are equal in reflection density to each other. Even in the case where the reflection densities of the latent image part and the background part on the original are equal to each other, there are the following problems. That is, the reflection density should be set so that the legibility of the original to be used together with a copy-forgery-inhibited pattern image for synthesizing image data is not imparted. Also, in the case where the latent image on a copy is not legible when the original is copied, the effectiveness of synthesis performed on the copy-forgery-inhibited pattern and the original is lost.

Hereinafter, the techniques for solving such problems are described below.

Details of Adjustment of Density of Copy-Forgery-Inhibited Pattern Image

Figure 16:
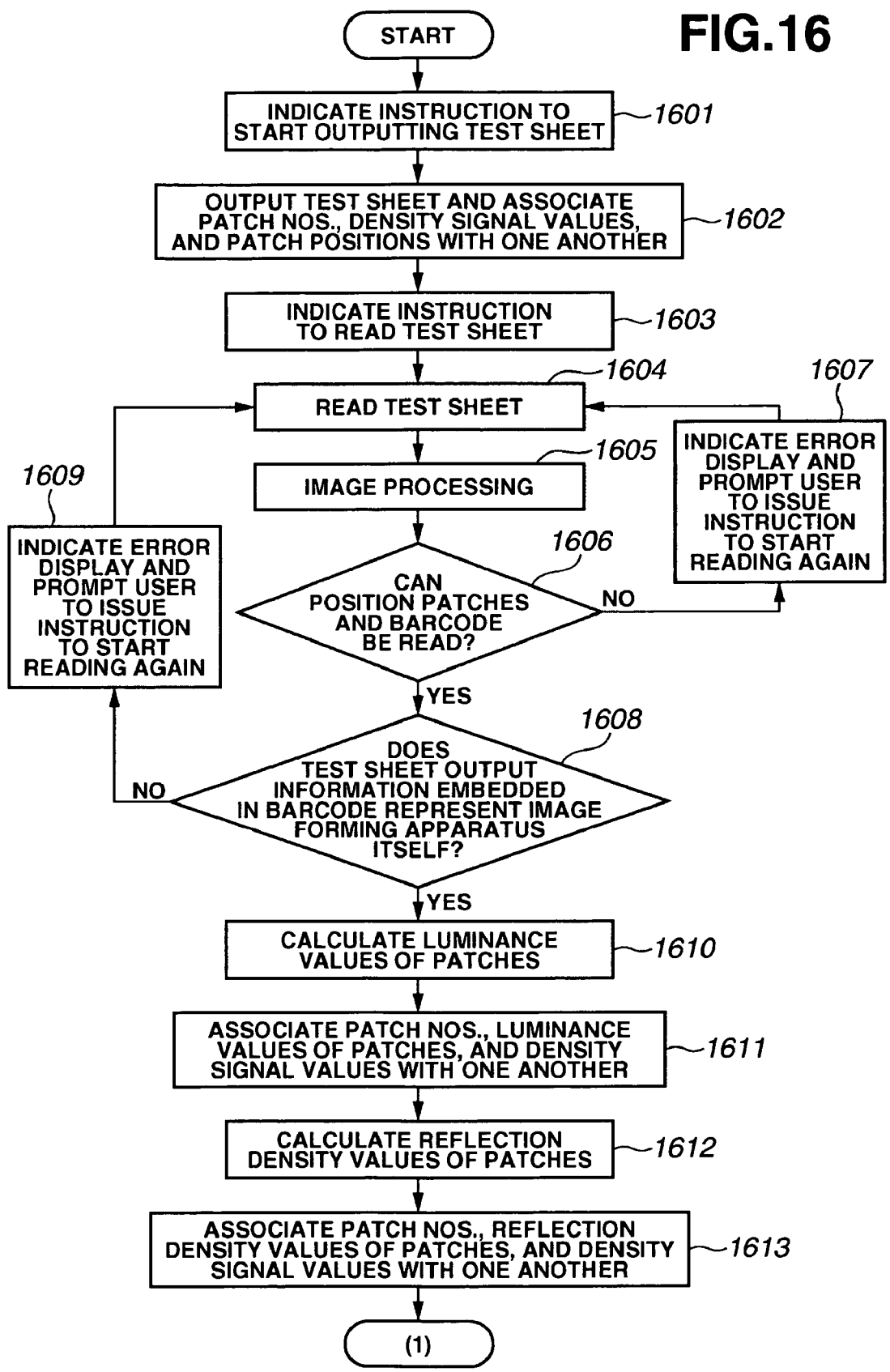
FIG. 16 is a flowchart illustrating the first half of a density adjustment method.
Figure 23:
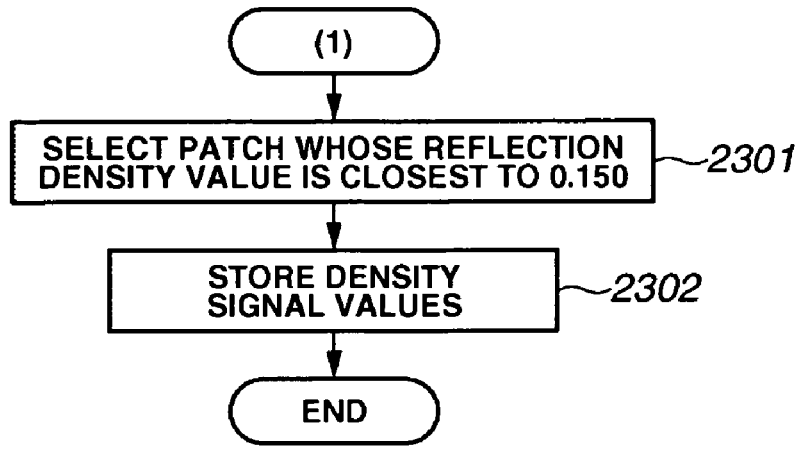
FIG. 23 is a flowchart illustrating the second half of the density adjustment method.

The flow of a process performed to adjust the density of a copy-forgery-inhibited pattern image is described below. The following process is supervisorily controlled by the CPU 301. Incidentally, flowcharts shown in FIGS. 16 and 23 illustrate an exemplary embodiment of the present invention. First, the first half of the process of adjusting the density of a copy-forgery-inhibited pattern image will be described with reference to FIG. 16.

In step 1601, a screen (not shown) used to accept an instruction to start outputting a test sheet is displayed on the operation unit 12. When the start of outputting a test sheet (the detail of the test sheet will be described later) is instructed in the operation unit 12, information on such an instruction is accepted from the operation unit 12. Then, the process advances to step 1602.

Subsequently, in step 1602, test sheet data 1 is generated. Simultaneously, information of the numbers of patches, information on the positions of the patches, and information on the density signal values used to generate the patches are associated with one another. Also, such kinds of information are stored in the RAM 302. Using the association thereamong, a table shown in FIG. 19 is created (the details of test sheet data 1, the information of the numbers of patches, the information on the positions of the patches, and the information on the density signal values and the table shown in FIG. 19 are described later). Subsequently, the test sheet data 1 is read from the RAM 302. Then, this test sheet data 1 is outputted to the printer unit 14 through the expansion unit 316, the printer image processing unit 315, and the printer I/F 314.

Now, the process performed by the expansion unit 316 will be described. Before sent to the expansion unit 316, the test sheet data 1 is uncompressed and is stored in the RAM 302. Therefore, the expansion unit 316 does not perform expansion on the test sheet data 1.

Next, the process performed by the printer image processing unit 315 will be described below. The printer image processing unit 315 performs the output gamma correction process and the halftone correction process on the test sheet data 1 received from the expansion unit 316. Incidentally, these processes correspond to the processes performed by the output gamma correction unit 605 and the halftone correction unit 606, respectively. On the other hand, the ground color removing process, the monochrome data generating process, the logarithmic conversion process, and the output color correction process are not performed. Incidentally, these processes correspond to the processes performed by the ground color removing unit 601, the monochrome data generating unit 602, the logarithmic conversion unit 603, and the output color correction unit 604 shown in FIG. 6, respectively. Incidentally, in step 1602, the process that the printer image processing unit 315 performs on the test sheet data 1, and the process that the printer image processing unit 315 does not perform thereon are matched with the process that the printer image processing unit 315 performs on the pattern-containing image data, and the process that the printer image processing unit 315 does not perform thereon, respectively (see "Formation of Image from Pattern-Containing Image Data"). This is because the reflection density value of the latent image part (or the background part) on the output paper is made to be equal to that of the latent image patches (or the background image patches) in the case where the latent image patches (or the background image patches) and the latent image part (or the background part) of the pattern-containing image are generated by using the same density signal value.

Figure 17:
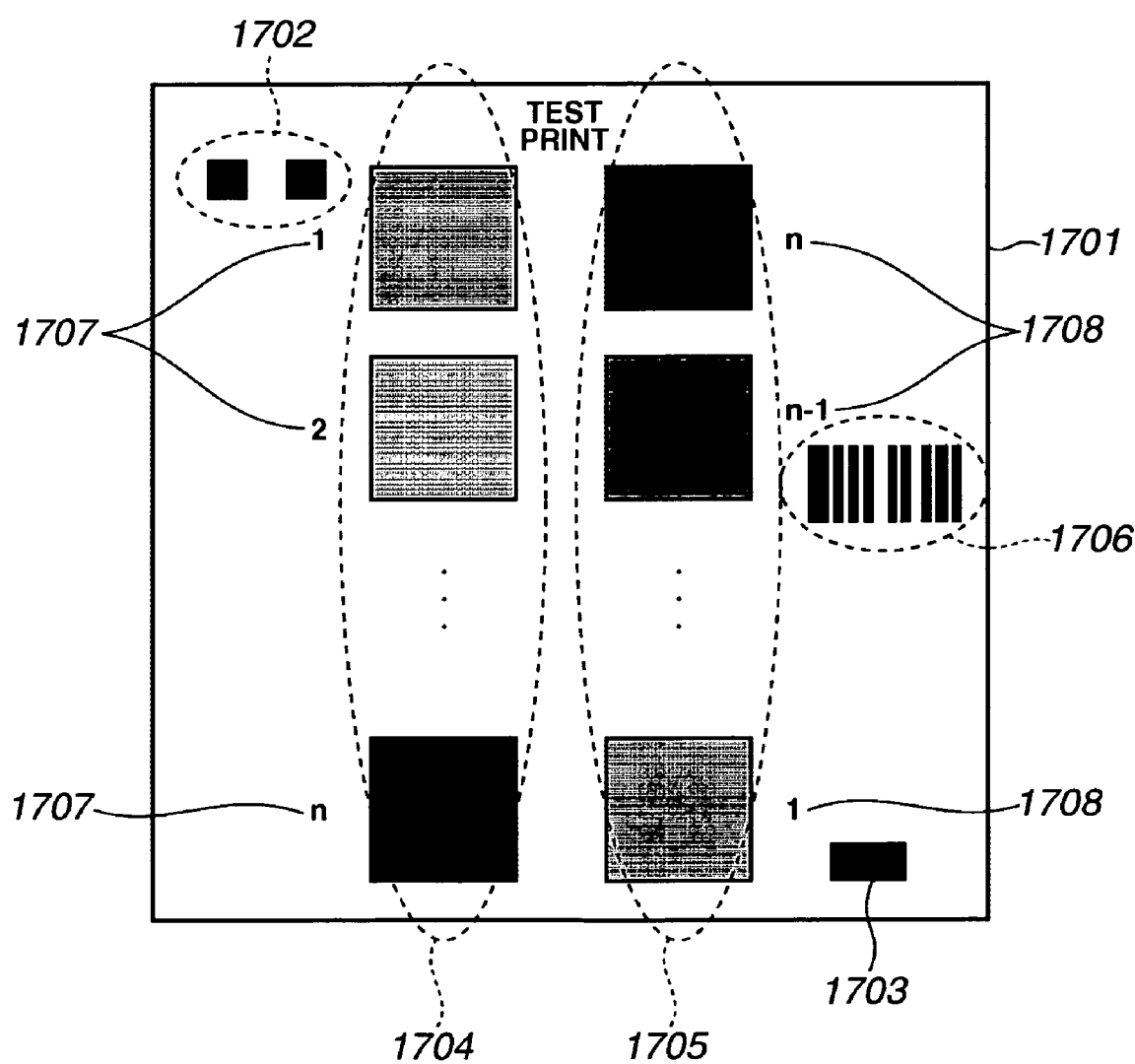
FIG. 17 is a diagram illustrating a test sheet.

Now, the details of the test sheet and the test sheet data 1 are described below. FIG. 17 is a diagram showing the test sheet and is also a diagram conceptually showing the test sheet data 1 generated to output the test sheet. Each of the test sheet and the test sheet data 1 shown in FIG. 17 has a plurality of latent image patches and a plurality of background image patches which are generated by using different density signal values. Density signal values can be changed either stepwise at uniform intervals or randomly. The density signal values used to generate the patches can optionally be set via the operation unit 12. Reference numeral 1704 designates a latent image patch group. Reference numeral 1705 denotes a background image patch group. The number of patches of the latent image patch group is equal to that of patches of the background image patch group in the case shown in FIG. 17 and is n (an integer equal to or larger than 2). However, the number of patches of the latent image patch group is not necessarily equal to that of patches of the background image patch group. The number of patches can be either set on the operation screen or set automatically. Reference numeral 1707 designates a latent image patch number. Reference numeral 1708 designates a background image patch number. This patch number is given to each of the patches of the latent image patch group and the background image patch group and is an integer value ranging from 1 to n. This test sheet has position patches 1702 and 1703 used to judge whether the test sheet is properly placed on an original table. The normal orientation of the test sheet can be known according to the places at which the position patches 1702 and 1703 are formed, and to the difference in shape therebetween. Apparatus identification information (ID, a serial number, or a network IP address indicating an output apparatus that outputs the test sheet) identifying the apparatus, which outputs the test sheet, or the apparatus, which generates the test sheet data 1, is hid in a barcode 1706. The barcode 1706 can be a two-dimensional one such as a QR-code (registered trademark), instead of a one-dimensional one. Incidentally, although color information representing one of C, M, and K colors is caused to accompany the test sheet data 1 before outputting, the color of the test sheet data according to the present invention is not limited thereto.

Hereinafter, details of information on the patch number, information on the patch position, and information on the density signal value used to generate the patch, and the table shown in FIG. 19 are described.

The information on the patch number represents numbers designated by 1707 and 1708. The information on the patch position represents the coordinate position of the patch on the test sheet and also represents the coordinate position indicated by the test sheet data 1. The information on the density signal value used to generate the patch represents the density signal values applied to the dither matrixes (the latent image matrix and the background matrix) when each of the patches included in the patch groups 1704 and 1705 is generated. These kinds of information are associated with one another corresponding to each of the patches on the table shown in FIG. 19. That is, on the table shown in FIG. 19, the information on the patch number of a certain patch, the information on the patch position of that patch, the information on the density signal value used to generate that patch are described on the same line and are associated with one another. Hereinafter, each expression which indicates that various kinds of information are described to be associated with one another means that the various kinds of information corresponding to one patch are associated with one another.

Upon completion of outputting the test sheet, an indication prompting a user to instruct the start of reading an outputted test sheet is displayed on an operation screen (not shown) in step 1603. When the user places the test sheet on the original table and instructs the start of reading the test sheet, information on an instruction to start reading the test sheet is received from the operation unit 12 by the operation screen. Then, this process advances to step 1604.

The scanner unit 14 performs an operation of reading the test sheet in step 1604. The read image data is sent to the scanner image processing unit 312 through the scanner I/F 311.

The scanner image processing unit 312 does not perform a masking process, a filtering process, and an input gamma correction process on the image data. Incidentally, these processes correspond to the processes performed by the masking unit 501, the filtering unit 502, and the input gamma correction unit 504, respectively. The histogram generating process, the color/monochrome judgment process, and the text/photo judgment process can be either performed or non-performed. Incidentally, these processes are those performed by the histogram generating unit 503, the color/monochrome judgment unit 505, and the text/photo judgment unit 506, respectively. Thereafter, image data outputted from the scanner image processing unit 312 is sent to the compression unit 313. Then, the compression unit 313 divides this image data into units of blocks each consisting of 32 pixels×32 pixels to thereby generate tile data. Further, the compression unit 313 compresses this image data (hereunder, this image data is called "test sheet data 2"). Then, the image data compressed by the compression unit 313 is sent to the RAM 302 and is stored therein. In step 1605, the process from the reception of the image data, which is obtained by scanning, by the scanner image processing unit 312 to the storing of the image data, which is sent through the compression unit 313, by the RAM 302 is performed.

Figure 18:
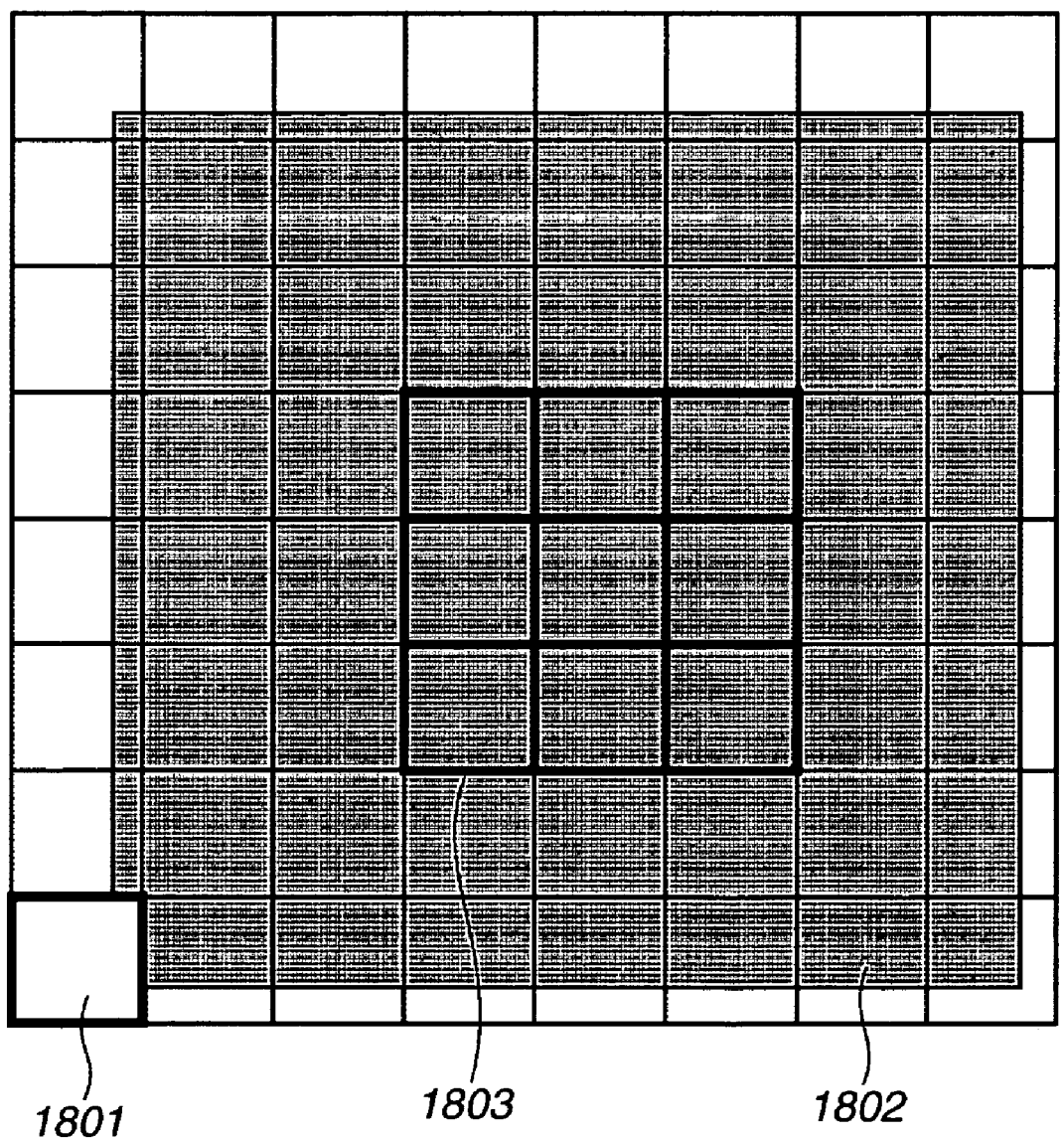
FIG. 18 is a diagram illustrating the relation between a patch and each of tile images.

The image data stored in step 1605 includes a plurality of tile data. Meanwhile, these tile images are sufficiently small in size, as compared with the patches. FIG. 18 shows the relation among the patch and the tile images. A region 1801 designates one tile image. A region 1802 denotes one patch. Regions 1803 designate nine tile images placed at the central part of the patch.

In step 1606, it is determined whether the position patches 1702 and 1703 and the barcode 1706 can be read. If determined to be impossible, the process proceeds to step 1607. If determined to be possible, the process proceeds to step 1608.

In step 1607, an error display is indicated on the operation screen. This error display prompts the user to place a correct test sheet and to instruct the start of reading the test sheet again. Subsequently, when the user replaces the test sheet and depresses a start key (not shown), the process proceeds to step 1604.

On the other hand, in step 1608, the apparatus identification information hid in the barcode 1706 is read. Then, it is determined whether this apparatus identification information identifies the image forming apparatus 10. If this apparatus identification information does not identify the image forming apparatus 10, the process proceeds to step 1609, where an error display is indicated on the operation screen. This error display is similar to that indicated in step 1607. When the user replaces the test sheet and depresses the start key (not shown), the process proceeds to step 1604. If it is determined in step 1608 that this apparatus identification information identifies the image forming apparatus 10, the process proceeds to step 1610.

In step 1610, the position information of each of the tile data of the image data on the test sheet, and the position information of each patch formed on the test sheet are obtained from the RAM 302. Then, it is determined whether each tile image is present in each patch. Then, the average value of the average luminance values of the tile data corresponding to the tile images determined to be present in each patch is obtained. This average value is stored in the RAM 302 as the luminance value of each patch. As stated above, the position information representing the coordinate position of each tile image is added to associated tile data as header information. The position information of each patch, which is generated when the test sheet data is generated, is present in the table shown in FIG. 19. The position information stored in the table shown in FIG. 19 is not that of the tile data generated from the read image data but is the information representing the location, at which an associated patch is generated, on the test sheet data when the test sheet data is generated. Information representing the average luminance value of each block constituted by 32 pixels ×32 pixels is generated when the image data obtained by reading the test sheet is divided into a plurality of tile data. The information representing the average luminance value is added to each tile data as the header information.

Subsequently, in step 1611, the luminance value of each patch and the table shown in FIG. 19 are read from the RAM 302. The luminance value of each patch, which is obtained by reading the test sheet, is associated with each patch information that is obtained when the test sheet data 1 is generated, and that represents the associated patch number and the associated density signal value. The association thereamong is performed according to the position information of each patch and the position information of the tile data, which are stored when the test sheet data 1 is generated. Thus, a table including information on the patch number, the density signal value, and the luminance value of each patch is created. FIG. 20 shows this table.

Subsequently, a luminance-reflection-density conversion table (FIG. 21) preliminarily stored in the HDD 304 is read. In step 1612, the reflection density value is obtained from the luminance values stored in the table, which is stored in the RAM 302 and is shown in FIG. 20, by referring to the luminance-reflection-density conversion table.

Subsequently, in step 1613, the obtained reflection density values and the table shown in FIG. 20 are read from the RAM 302. The reflection density values of the patches are associated with the patch numbers and the density signal values, instead of the luminance values of the patches. The result of the association is stored in the RAM 302. In a table shown in FIG. 22, the information on the patch number of each patch, the reflection density values, and the density signal value that is used when each patch is generated are associated with one another.

Incidentally, although the reflection density values are obtained from the luminance value of each patch by referring to a table in step 1612, the method of obtaining the reflection density values according to the invention is not limited thereto. For example, the reflection density values can be obtained by performing computation using a matrix. Alternatively, the reflection density values can be obtained by using two tables or matrixes respectively corresponding to the latent image and the background. Alternatively, the reflection density values can be obtained by using tables or matrixes respectively corresponding to colors, such as black, cyan, magenta, and yellow.

First Density Signal Value Determination Method

Figure 24:
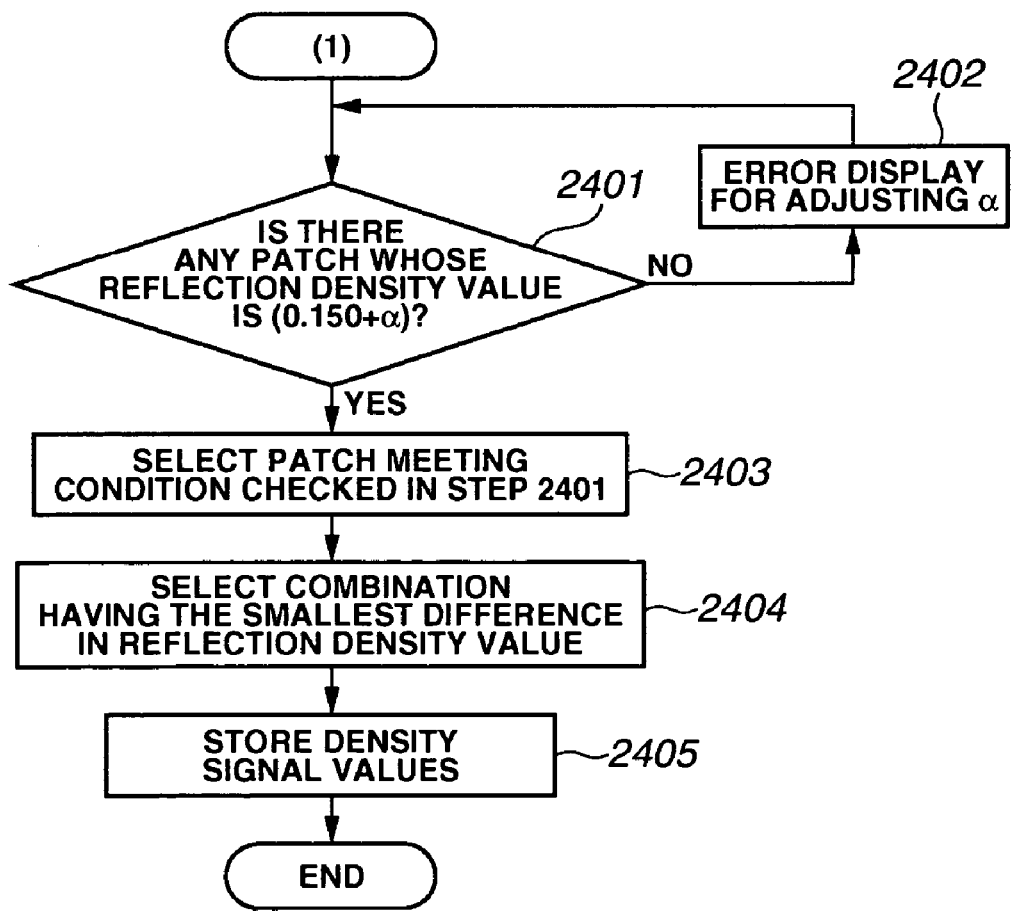
FIG. 24 is another flowchart illustrating the second half of the density adjustment method.
Figure 25:
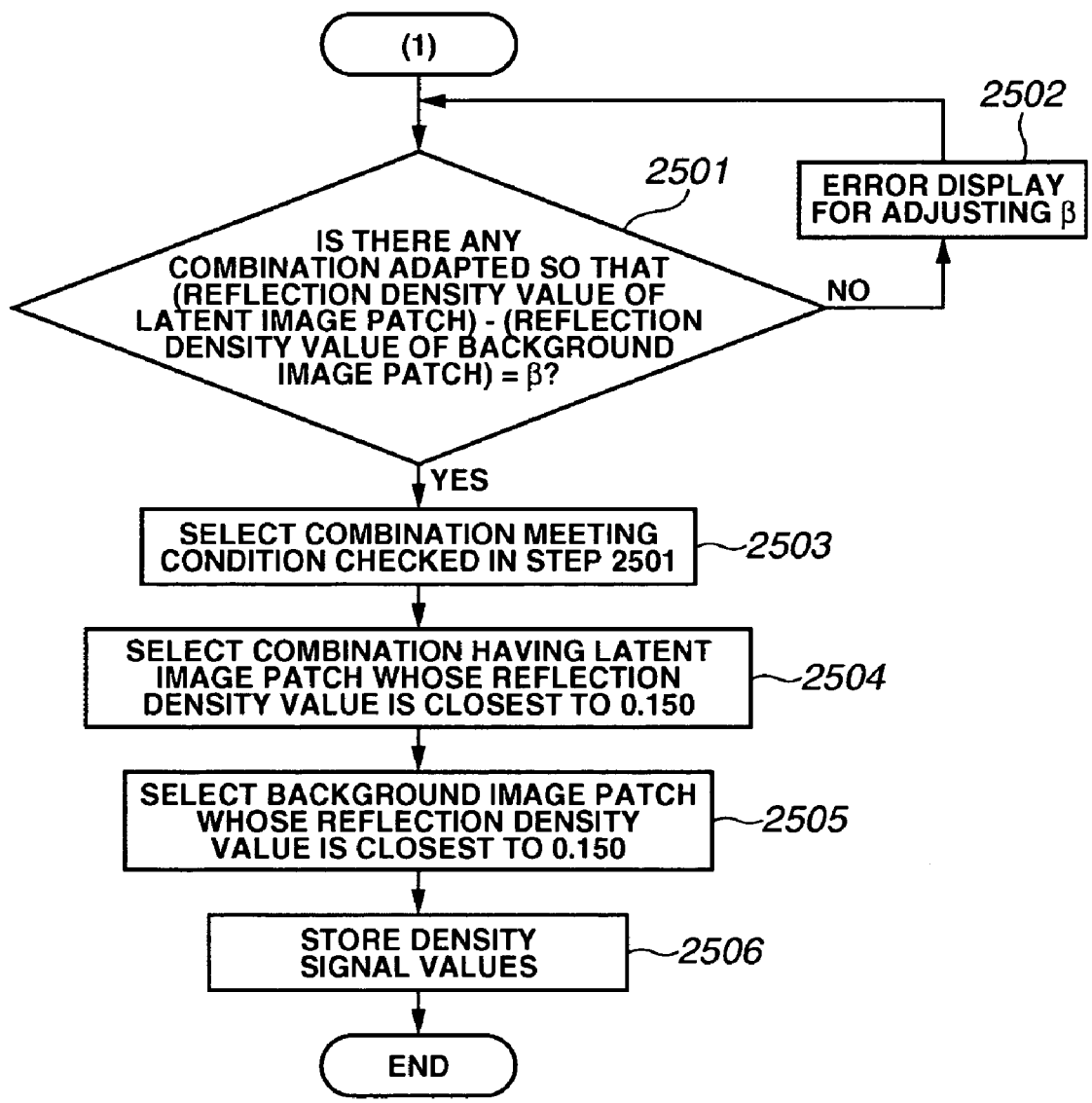
FIG. 25 is another flowchart illustrating the second half of the density adjustment method.
Figure 26:
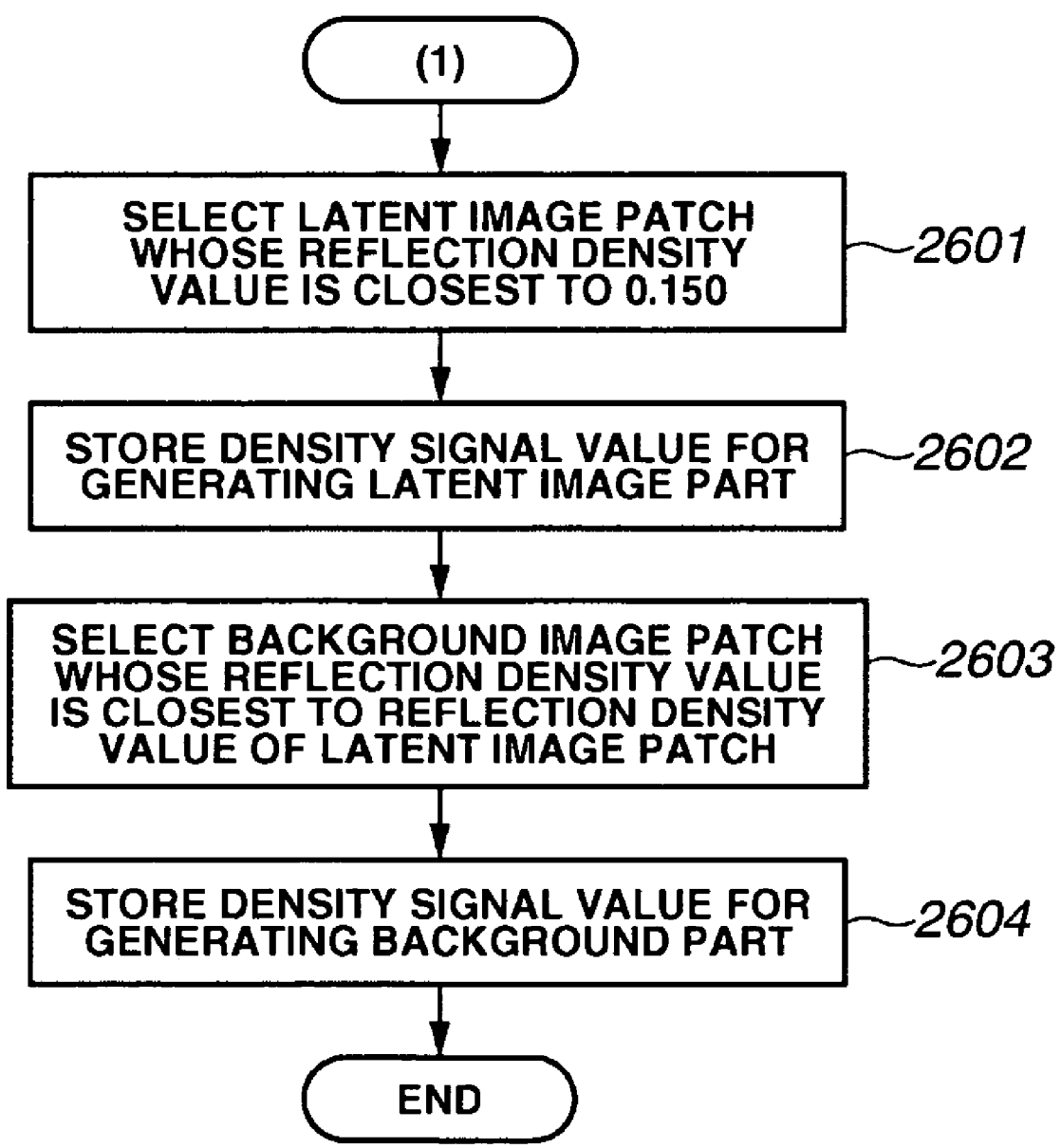
FIG. 26 is another flowchart illustrating the second half of the density adjustment method.

A first density signal value determination method aims at determining an appropriate density signal value used to generate a copy-forgery-inhibited pattern image having a reflection density value that is present in the vicinity of a predetermined value. The first density signal value determination method will be described with reference to to FIG. 23. When the density signal values are determined, a process illustrated in FIG. 24, 25, or 26 can be performed, instead of the process illustrated in FIG. 23. The processes illustrated in FIGS. 24, 25, and 26 will be described later.

In step 2301, the reflection density values of latent image patches and background image patches are compared with one another. According to the result of the comparison, the latent image patch and the background image patch, which have reflection density values closest to 0.150, are selected. At the selection, in the case where there is a plurality of latent image patches the reflection density value of each of which differs from a value of 0.150 by the same amount, any of such patches can be selected. This also holds good for the background image patches.

Incidentally, the predetermined reflection density value of 0.150 is empirically obtained as an optimal reflection density value of the copy-forgery-inhibited pattern image to meet the following two conditions. As stated above, as a first condition, it is necessary that the optimal copy-forgery-inhibited pattern image does not degrade the legibility of texts and line drawings formed on an original used together with this copy-forgery-inhibited pattern image to synthesize an image. As a second condition, it is also necessary that a latent image part is reproduced on a copy obtained by copying an output image synthesized from the original and the copy-forgery-inhibited pattern image, and that a background part is hard to be reproduced on the copy. The predetermined reflection density value of 0.150 has been empirically obtained to satisfy the first and second conditions. For example, in the case of using the table illustrated in FIG. 22, the reflection density values of the latent image patches are 0.134, 0.145, 0.160, 0.172, and so on. Among these values, the value closest to 0.150 is 0.145. Thus, the latent image patch No. 2 is selected. Similarly, the background image patch No. 2 is selected.

Subsequently, in step 2302, the density signal values corresponding to the patch Nos. of the selected latent image patch and the selected background image patch are stored in the HDD 304. That is, in the case of using the table shown in FIG. 22, the value (N+1) is stored in the HDD 304 as the density signal value used to generate the latent image part, while the value (M+1) is stored in the HDD 304 as the density signal value used to generate the background part.

In the case where a plurality of combinations of the selected latent image patch and the selected background image patch is finally present, it is necessary to select one of the combinations according to a given rule. As long as one of the combinations can be selected, virtually any rule can be employed. For instance, the following examples can be employed as the rule. That is, the combination of the selected latent image patch and the selected background image patch, the difference in reflection density value of which is smallest, is selected. Alternatively, the combination of the selected latent image patch and the selected background image patch, which are combined with each other so that the reflection density of the selected latent image patch is lower(or higher) than the reflection density of the selected background image patch, is selected. In the following embodiments and the following density determination methods, in the case where a plurality of the combinations is finally present, it is advisable to select one of the combinations according to a given rule.

Thus, the adjustment of the density of the copy-forgery-inhibited pattern image is completed. The copy-forgery-inhibited pattern image generated by performing this method uses these density signal values and is an optimal copy-forgery-inhibited pattern image that meets the aforementioned two conditions.

Although the entire method is performed in the image forming apparatus 10, the manner of performing the determination method according to the present invention is not limited thereto. For instance, information is transferred to a server or the PC 40, and processing to be performed in steps 1610 to 1613 and 2301 is performed by the server or the PC 40, instead of the image forming apparatus 10. Then, the result of the processing is transmitted from the server or the PC 40 to the image forming apparatus 10.

Although omitted in the foregoing description, when needed, the process of storing the image data in the ROM 303 and the HDD 304 and the process of reading the image data stored in the ROM 303 and the HDD 304 can be performed. This holds good for the following embodiments of the present invention.

According to the aforementioned first density signal value determination method, an appropriate density signal value used to generate a copy-forgery-inhibited pattern image, the reflection density value of which is present in the vicinity of a predetermined value, can surely and automatically be determined. This method does not need users' visual evaluation when the appropriate density signal value is determined. Thus, any user can determine the same density signal value as an appropriate density signal value when performing the adjustment of the density of a copy-forgery-inhibited pattern image. Also, a step, in which a user inputs the patch number, is unnecessary when determining an appropriate density signal value. Consequently, the density signal value can be prevented from being determined due to input errors to be a non-optimal value.

Meanwhile, in the aforementioned embodiment, the reflection density value of each patch is calculated from the luminance value thereof. Then, a patch having the reflection density value, the difference from the predetermined value (the reflection density value of 0.150) of which is smallest, is selected. An appropriate density signal value used to generate a copy-forgery-inhibited pattern image is determined according to the selected patch. The manner of determining the appropriate density signal value according to the present invention is not limited thereto. For example, an appropriate density signal value used to generate a copy-forgery-inhibited pattern image can be determined without calculating the reflection density value. According to an example of such a method, a patch having a luminance value, the difference from a predetermined value (a luminance value corresponding to the reflection density value of 0.150) of which is smallest, is selected. Then, an appropriate density signal value used to generate a copy-forgery-inhibited pattern image is determined according to the selected patch. Such a patch can be selected without replacing the luminance value with the reflection density value. This holds good for the following second to fourth density signal value determination methods and for the following third and fourth embodiments.

Second Density Signal Value Determination Method

Next, another method of determining the density signal value of a copy-forgery-inhibited pattern image will be described below. The aforementioned first density signal value determination method aims at determining an appropriate density signal value used to generate a copy-forgery-inhibited pattern image having a reflection density value that is present in the vicinity of a predetermined value. Meanwhile, a second density signal value determination method aims at determining an appropriate density signal value used to generate a copy-forgery-inhibited pattern image which has a reflection density value that is present in the vicinity of a predetermined value, and which also has high latent-image concealability (the reflection density values of a latent image part and a background part of an original are nearly equal to each other). This method is described below with reference to FIG. 24.

In step 2401, it is judged whether both of a latent image patch and a background image patch, each of which has a reflection density value of 150+α (−0.010≦α≦0.010) where 0.150 is an optimal reflection density value and α is a tolerance, are present. In the judgment, the difference between the reflection density value of each patch and the optimal value of 0.150 is compared with the value α. If it is judged as a result of the comparison that both of such a latent image patch and such a background image patch are present, this process advances to step 2403. If it is judged that both of such a latent image patch and such a background image patch are absent, this process proceeds to step 2402. Incidentally, this value α can be changed by a user through the operation unit 12.

In step 2402, an error display is indicated on the operation screen. Simultaneously, an indication used to prompt the user to adjust the tolerance α is displayed thereon. When the user performs the adjustment of the tolerance α and subsequently depresses the start key (not shown), the process returns to step 2401.

Subsequently, in step 2403, the latent image patch and the background image patch, which meet the conditions tested in step 2401, are selected. For example, in the case where the table shown in FIG. 22 is used, the latent image patches Nos. 2 and 3, and the background image patches Nos. 1 to 3 are selected in step 2403.

Subsequently, in step 2404, among the combinations of the latent image patches and the background image patches selected in step 2403, the combination of the latent image patch and the background image patch, the difference of the reflection densities of which is smallest, is selected. At this selection, the reflection density of each of the latent image patches included in the combinations selected in step 2403 is compared with that of each of the background image patches also included in the combinations. This means that the combination of the latent image patch and the background image patch realizing high concealability of the latent image formed on the original is selected. That is, the generation of a copy-forgery-inhibited-pattern-containing print having a latent image, which is difficult to view on the original, is enabled by selecting the combination of the latent image patch and the background image patch, the difference in reflection density between which is smallest. That is, in the case of using the table shown in FIG. 22, the combination of the latent image patch No. 2 and the background image patch No. 1 is selected.

Subsequently, in step 2405, the density signal values corresponding to the Nos. of the latent image patch and the background image patch of the combination selected in step 2404 are stored in the HDD 304 which thus serves as a holding unit for them. That is, in the case of using the table shown in FIG. 22, in step 2405, a value of (N+1) is stored in the HDD 304 as the density signal value used to generate a latent image part, while a value of M is stored in the HDD 304 as the density signal value used to generate a background part.

Thus, the adjustment of the density of the copy-forgery-inhibited pattern image is finished. The copy-forgery-inhibited pattern image, which is generated after performing this method, uses these density signal values.

According to this method, in the case where there are no patches meeting the condition judged in step 2401, the tolerance α is adjusted by the user in step 2402. However, the process can be returned to step 2401 without causing the user to adjust the tolerance α. Then, a test sheet can be outputted again. When a test sheet is outputted again, it is necessary to make a test sheet that differs from the already outputted test sheet (that is, it is necessary to make a new test sheet by using a density signal value which differs from the density signal value utilized when the last used test sheet is produced) This holds good for the following embodiments.

The aforementioned second density signal value determination method has advantages in that a copy-forgery-inhibited pattern image having high latent image concealability (that is, the reflection density values of a latent image part and a background part are nearly equal to each other) can be outputted, in addition to the advantages obtained by performing the first density signal value determination method.

Third Density Signal Value Determination Method

Next, another method of determining the density signal value of a copy-forgery-inhibited pattern image will be described below. According to the aforementioned second density signal value determination method, the appropriate density signal value used to generate a copy-forgery-inhibited pattern image is determined by selecting the latent image patch and the background image patch, the reflection density values of which are present in the vicinity of the predetermined value, and further selecting the combination of the latent image patch and the background image patch, the difference in reflection density value between which is smallest. However, there is a limit to the number of patches that can be formed on a test sheet. Thus, when the density adjustment is performed according to the second density signal value determination method by using a test sheet on which a small number of patches are formed, there is the possibility of selecting the latent image patch and the background image patch of the combination, whose latent-image concealability is not high, i.e., whose difference in reflection density value exceeds a predetermined value. It is considered as a countermeasure against this to utilize a plurality of test sheets to select an optimal combination from many patches. However, in such a case, it takes time to generate, output, and read test sheet data.

Thus, according to the third density signal value determination method, combinations of a latent image patch and a background image patch, the difference in reflection density value between which is equal to or less than a predetermined value, are first selected. Thereafter, a combination of a latent image patch and a background image patch, the reflection density values of both of which are present in the vicinity of a predetermined value, is selected. Consequently, appropriate density signal values used to generate a copy-forgery-inhibited pattern image having high latent-image concealability (the difference in reflection density value between a latent image part and a background part on an original is surely equal to or less than a predetermined value) can be determined by utilizing a small number of test sheets. This method is described below with reference to FIG. 25.

In step 2501, it is judged whether there is a combination of a latent image patch and a background image patch, whose reflection density values are set so that the reflection density value of the latent image patch−the reflection density value of the background image patch=β (β is equal or more than −0.005 and is equal to and less than 0.005). At the judgment, the difference in reflection density value between the latent image patch and the background image patch is compared with the value β. If it is judged as a result of the comparison that such a combination is present, this process advances to step 2503. If it is judged that such a combination is absent, this process proceeds to step 2502. Incidentally, this value β can be changed by a user through the operation unit 12.

In step 2502, an error display is indicated on the operation screen. Simultaneously, an indication used to prompt the user to adjust the value β is displayed thereon. When the user performs the adjustment of the value β and subsequently depresses the start key (not shown), the process returns to step 2501.

Subsequently, in step 2503, the latent image patch and the background image patch, which meet the conditions tested in step 2501, are selected. For example, in the case where the table shown in FIG. 22 is used, the following combinations of the latent image patch and the background image patch, {(2, 1), (2, 2), (3, 3), (3, 4), (4, 4), . . . } are selected in step 2503. Incidentally, for instance, the expression (2, 1) indicates the combination of the latent image patch No. 2 and the background image patch No. 1.

Subsequently, in step 2504, the apparatus searches the combinations selected in step 2503 for the latent image patch, whose reflection density value is closest to 0.150. At the search, the reflection density of each of the latent image patches included in the combinations are compared with the value of 0.150. Thus, a combination of the latent image patch and the background image patch, which includes such a latent image patch, is selected. That is, in the case of using the table shown in FIG. 22, the combinations {(2, 1), (2, 2)} are selected in step 2505.

Subsequently, in step 2505, the apparatus searches the combinations selected in step 2504 for the background image patch, whose reflection density value is closest to 0.150. Then, a combination of the latent image patch and the background image patch, which includes such a background image patch, is selected. That is, in the case of using the table shown in FIG. 22, the combination (2, 2) is selected in step 2505.

Subsequently, in step 2506, the density signal values corresponding to the Nos. of the latent image patch and the background image patch of the selected combination are stored in the HDD 304. That is, in the case of using the table shown in FIG. 22, in step 2506, a value of (N+1) is stored in the HDD 304 as the density signal value used to generate a latent image part, while a value of (M+1) is stored in the HDD 304 as the density signal value used to generate a background part.

Thus, the adjustment of the density of the copy-forgery-inhibited pattern image is finished. The copy-forgery-inhibited pattern image, which is generated after performing this method, uses these density signal values.

According to this method, in the case where there are no patches meeting the condition judged in step 2501, the value β is adjusted by the user in step 2502. However, the process can be returned to step 2501 without causing the user to adjust the value β. Then, a test sheet can be outputted again. When a test sheet is outputted again, it is necessary to make a test sheet that differs from the already outputted test sheet. This holds good for the following embodiments.

Thus, the third density signal value determination method can provide an advantage in that a copy-forgery-inhibited pattern image having high latent-image concealability (the difference in reflection density value between a latent image part and a background part on an original is with certainty equal to or less than a predetermined value) can be outputted only by utilizing a small number of test sheets, in addition to the advantages obtained by performing the first and second density signal value determination methods.

Fourth Density Signal Value Determination Method

Next, another method of determining the density signal value of a copy-forgery-inhibited pattern image will be described below. This method will be described with reference to FIG. 26.

In step 2601, a latent image patch, the reflection density value being closest to 0.150, is selected. At selection, the reflection density value of each latent image patch is compared with a value of 0.150. Incidentally, in the case where there is a plurality of latent image patches, the reflection density value of each of which is closest to a value of 0.150, it is advisable to select one of such latent image patches. When such a latent image patch is selected, any of the aforementioned rules can be used. For instance, in the case of using the table shown in FIG. 22, the latent image patch No. 2 is selected in step 2601.

Subsequently, in step 2602, the density signal value corresponding to the patch No. of the selected latent image patch is stored in the HDD 304. That is, in the case of using the table shown in FIG. 22, the value (N+1) is stored in the HDD 304 as the density signal value used to generate the latent image part.

Subsequently, in step 2603, the background image patch having a reflection density value closest to the reflection density value of the latent image patch selected in step 2601 is selected. At the selection, the reflection density value of each of the background image patches is compared with the reflection density value of the latent image patch selected in step 2601. Incidentally, in the case where there is a plurality of background image patches, the reflection density value of each of which is closest to the reflection density value of the latent image patch, it is advisable to select one of such background image patches. When such a background image patch is selected, any of the aforementioned rules can be used. That is, in the case of using the table shown in FIG. 22, the background image patch No. 1 is selected in step 2603.

Subsequently, in step 2604, the density signal values corresponding to the patch No. of the selected background image patch is stored in the HDD 304. That is, in the case of using the table shown in FIG. 22, the value M is stored in the HDD 304 as the density signal value used to generate the background part.

Thus, the adjustment of the density of the copy-forgery-inhibited pattern image is finished. The copy-forgery-inhibited pattern image, which is generated after performing this method, uses these density signal values.

Meanwhile, according to this method, the density signal value used to generate the background part is determined after the density signal value used to generate the latent image part is determined. However, the process according to the invention is not limited thereto. For example, the following process can be employed. That is, one background image patch having a reflection density closest to 0.150 is selected. Then, the density signal value used to the background part, which value corresponds to the selected patch, is determined. Thereafter, a latent image patch having a reflection density closest to the reflection density value of the selected background image patch is selected. The density signal value used to generate the latent image part, which corresponds to the selected latent image patch, is determined.

According to each of the aforementioned density signal value determination methods, the density signal value used to generate the latent image part and the density signal value used to generate the background part are obtained by utilizing the test sheet shown in FIG. 17. However, generally, the image forming apparatus has properties that large dots can stably be formed, while small dots cannot stably be formed (the ability to form small dots is easily affected by the external factors such as change in environment and secular variation). Thus, in the case where the density signal value used to generate the latent image part is once adjusted, the reflection density of the latent image part of the copy-forgery-inhibited pattern image does not change greatly for a certain time. That is, the reflection density value of the latent image part can be maintained in the vicinity of 0.150. The reverse holds good for the background part. Therefore, it is necessary to adjust the density of the background part in a short cycle.

Figure 27:
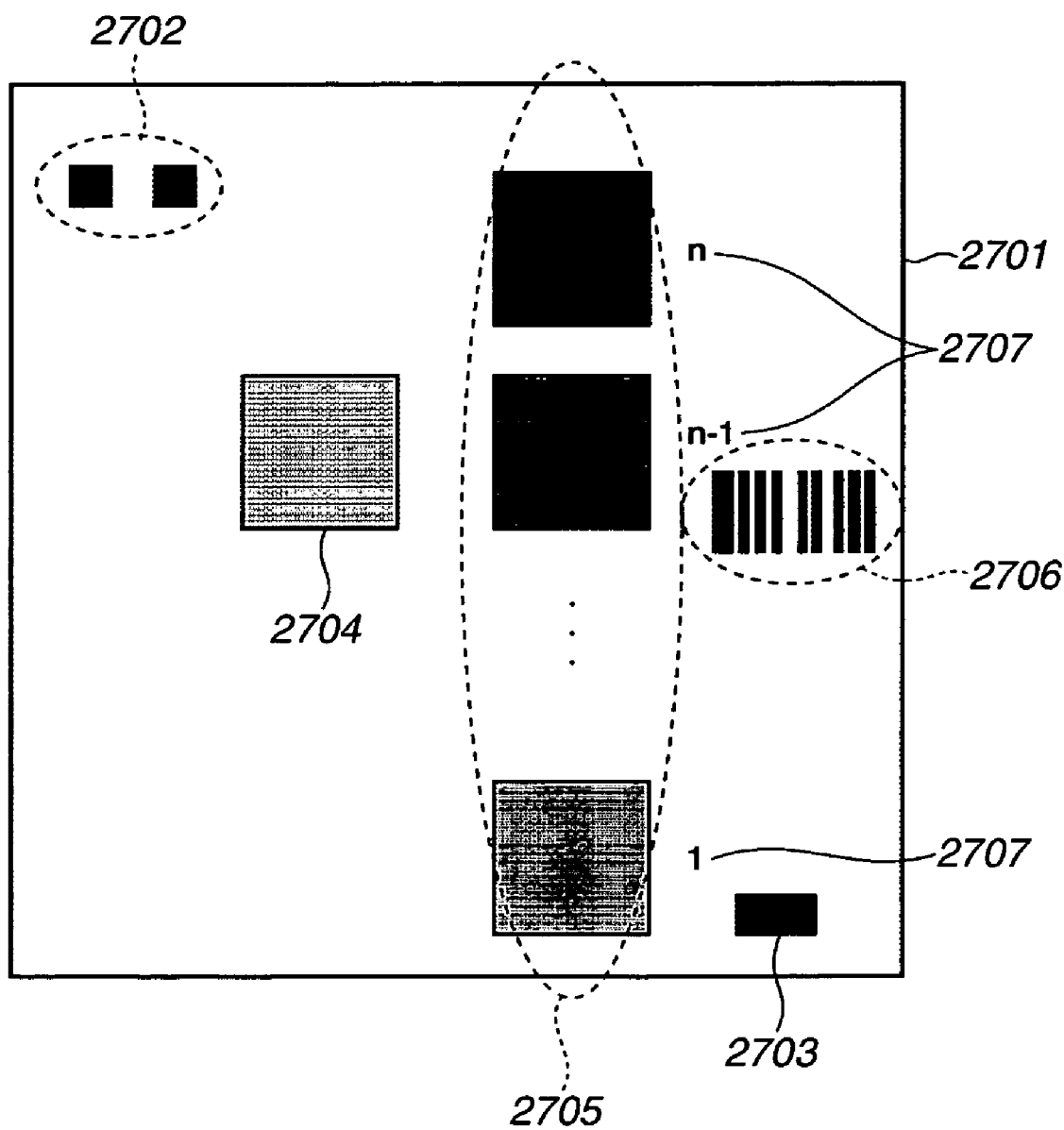
FIG. 27 is a diagram illustrating another test sheet.

The test sheet shown in FIG. 27 is used only to adjust the density of the background part by assuming that the reflection density of the latent image part is maintained in the vicinity of 0.150. The adjustment of the density of the background part is performed by utilizing the test sheet shown in FIG. 27 as follows.

First, the same process as described by referring to the flowchart of FIG. 16 is performed by assuming that the test sheet shown in FIG. 27 is outputted. In step 1602, a test data sheet 1 is generated by using the density signal value which is to be used to generate a latent image part and is determined at the last adjustment of the density. Then, the test sheet is outputted. Subsequently, the reflection density value of the background image patch, whose reflection density value is closest to the reflection density value of the latent image patch, is determined by referring to the table generated in step 1613. Thus, the adjustment of the density of the copy-forgery-inhibited pattern image is finished.

In FIG. 27, reference numeral 2701 designates a test sheet. Reference numeral 2704 denotes a latent image patch. Reference numeral 2705 designates a background image patch group. Reference numeral 2707 denotes a background image patch number. Reference numerals 2702 and 2703 designate position patches. Reference numeral 2706 denotes a barcode in which apparatus identification information (ID, a serial number, or a network IP address indicating an output apparatus that outputs the test sheet) identifying the apparatus outputting the test sheet or generating the test sheet data 1 is hid According to each of the aforementioned density signal value determination methods, the adjustment of the density of the copy-forgery-inhibited pattern image is finished by finally storing the density signal values in the HDD 304. However, the manner of finishing the adjustment of the density of the copy-forgery-inhibited pattern image according to the invention is not limited thereto. For instance, binary patterns (the latent image pattern and the background pattern) according to the density signal values can be stored in the HDD 304.

Meanwhile, according to the aforementioned density signal value determination methods, the appropriate density signal value is determined by being selected from the density signal values used when one of the patches on the test sheet is formed. However, the manner of selecting the density signal value according to the present invention is not limited thereto. For example, an appropriate density signal value can be determined by performing estimation as described below. This method is described below.

First, a test sheet is generated and is outputted by setting an interval (for instance, 8 levels) between the density signal value, which is used to generate the latent image part, and the density signal value, which is used to generate the background part. Subsequently, the density signal value, which is used to generate the latent image part, and the density signal value, which is used to generate the background part, corresponding to a reflection density value of 0.150 are estimated by using this test sheet and performing interpolation.

Hereinafter, this density signal value determination method in the case of generating the table shown in FIG. 28 will be described in detail by way of example. In the table shown in FIG. 28, the patch numbers, the reflection density values of patches, and density signal values to be used to generate patches are associated with one another, similarly to the table shown in FIG. 22.

Referring to FIG. 28, the density signal value of the latent image patch, which value corresponds to the reflection density value of 0.150, is estimated to range from L to (L+8). The density signal value of the background image patch, which value corresponds to the reflection density value of 0.150, is estimated to range from (K+8) to (K+16). Under this estimation, the appropriate density signal values are obtained by performing the following interpolation.

In the case of a latent image, (a density signal value to be obtained)=$L+\{(L+8)-L\} \times (0.150-0.108)/(0.157-0.108) \approx L+7$ (Rounded Off)

In the case of a background, (a density signal value to be obtained)=$K+8+\{(K+16)-(K+8)\} \times (0.150-0.138)/(0.164-0.138) \approx K+12$ (Rounded Off)

Incidentally, the interpolation can be nonlinear interpolation, instead of linear interpolation.

According to the present density signal value determination method, a patch having a reflection density value, the difference from a predetermined value (a reflection density value of 0.150) of which is smallest, is determined after the reflection density value is calculated from the luminance value of each patch. The process of determining the appropriate density signal value according to the present invention is not limited thereto. For example, the appropriate density signal value to be used to generate a copy-forgery-inhibited pattern image can be determined without calculating the reflection density value. An example of such a method is to find a patch having a luminance value, the difference from the predetermined value (the luminance value corresponding to the reflection density value of 0.150) of which is smallest, by calculation. According to this method, first, the range of the density signal value of a patch corresponding to the predetermined value (the luminance value corresponding to the reflection density value of 0.150) is estimated, similarly to the aforementioned density signal value determination method. Then, the density signal value is uniquely determined by using the aforementioned interpolation equation.

Second Embodiment

A second embodiment of the present invention aims at surely and automatically determining an appropriate density signal value, which is used to generate a copy-forgery-inhibited pattern image, to output the copy-forgery-inhibited pattern image having high visualizability (the difference between the reflection density value of a latent image part on a copy and the reflection density value of a background part thereon is large).

According to the present embodiment, first, test sheet data 3 (image data representing an image set to be as close as possible to an image obtained by actually copying a test sheet) is generated. Subsequently, the density values of latent image patches and those of background image patches formed on a test sheet represented by the test sheet data 3 are obtained.

Then, the combination of the patches, the difference in density value between which is largest, is selected. Finally, the density signal values respectively corresponding to the selected patches are stored in the HDD 304. Thus, the adjustment of the density of the copy-forgery-inhibited pattern image is finished.

Figure 29:
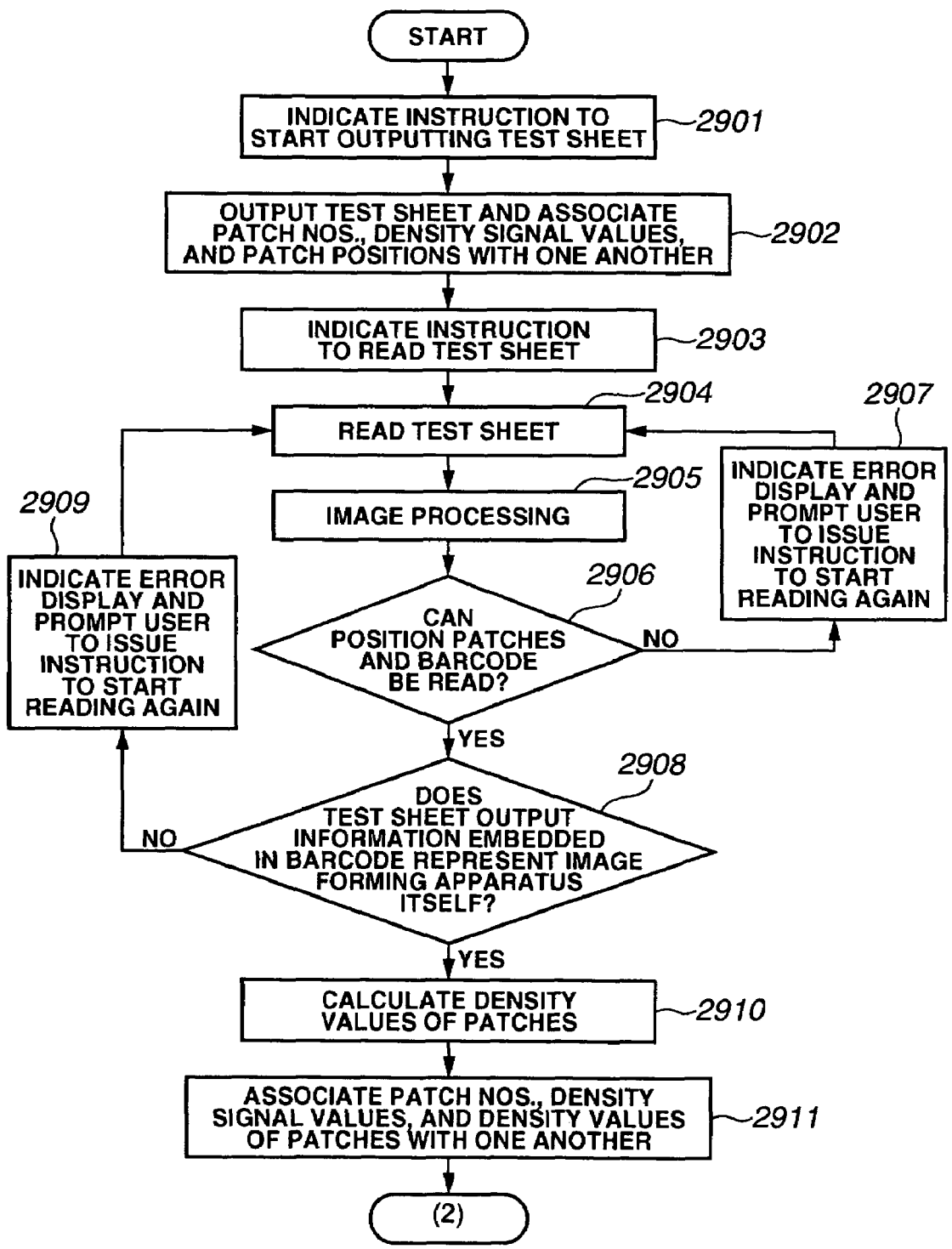
FIG. 29 is a flowchart illustrating the first half of another density adjustment method.

This process is described below in detail by referring to flowcharts shown in FIGS. 29 and 31. Hereinafter, the first half of the flow of the process of adjusting the density of the copy-forgery-inhibited pattern image will be described by focusing attention on the difference between FIG. 29 (the second embodiment) and FIG. 16 (the first embodiment). Step 1605 and steps 1610 to 1613 shown in FIG. 29 differ from step 2905 and steps 2910 to 2911 shown in FIG. 16, respectively.

First, the difference between steps 1605 and 2905 will be described below. Processing performed in step 1605 is similar to the aforementioned processing. Thus, the description of the processing performed in step 1605 is omitted. In contrast, in step 2905, the scanner image processing unit 312 performs a masking process, a filtering process, and an input gamma correction process on received image data, and outputs resultant image data. The output image data is sent to the RAM 302 through the compression unit 313 and is stored therein. Subsequently, this image data is sent to the color space conversion unit 322 through the expansion unit 318. Then, the color space conversion unit 322 performs a ground color removing process, a monochrome data generating process, a logarithmic conversion process, and an output color correction process on this image data, and then outputs resultant image data. The output image data is sent to the RAM 302 through the compression unit 319 and is stored therein as the test sheet data 3. The reason for performing the masking process, the filtering process, the input gamma correction process, the ground color removing process, the logarithmic conversion process, and the output color correction process on the image data to generate the test sheet data 3 is that image data, which is almost the same image data as a copy obtained by copying the test sheet, is generated.

Next, the difference between steps 1610 to 1613 and steps 2910 to 2911 will be described below. In steps 1610 to 1613, tables shown in FIGS. 20 and 22 are generated according to the test sheet data 2. In contrast, in steps 2910 to 2911, a table shown in FIG. 30 is generated according to the test sheet data 3. Incidentally, in the table shown in FIG. 30, the density values of patches obtained by reading the test sheet are associated with the density signal values used to generate the patches, and with the patch numbers of the patches.

Incidentally, the test sheet data 2 is RGB-data (luminance data), on which no logarithmic conversion process is performed. Thus, in the table shown in FIG. 20, the luminance values of the patches are associated with the density signal values and with the patch numbers. In contrast, the test sheet data 3 is CMY-data (density data) obtained by performing the logarithmic conversion process on the image data. Therefore, in the table shown in FIG. 30, the density values of the patches are associated with the density values and with the patch numbers.

Density Signal Value Determination Method

Next, a density signal value determination method according to the second embodiment will be described with reference to FIG. 31.

Figures 30, 31:
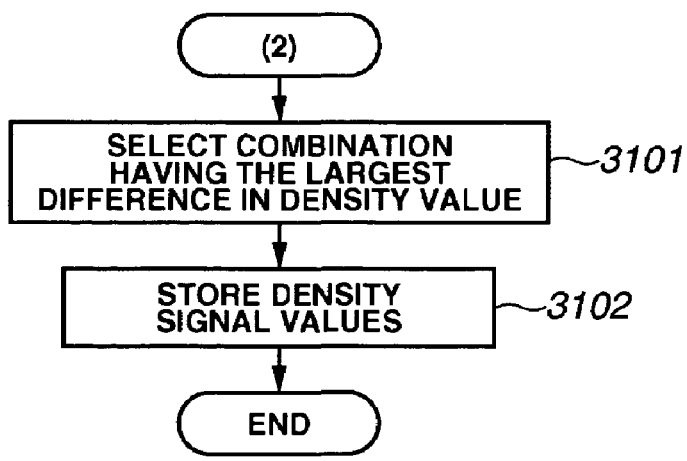
FIG. 30 is a table illustrating an association among parameters of patches.
FIG. 31 is a flowchart illustrating the second half of the density adjustment method.

In step 3101, a combination of a latent image patch and a background image patch, the difference in density value between which is largest, is selected by referring to the table shown in FIG. 30. At the selection, the reflection densities of the latent image patches are compared with those of the background image patches. This process determines the density signal value at which the difference in density between the latent image part and the background part on a copy obtained by copying an original having a copy-forgery-inhibited pattern image formed thereon is largest.

Subsequently, in step 3102, the density signal values corresponding to the selected patch number are stored in the HDD 304.

The density signal value determination method according to the present invention is not limited to the aforementioned method of selecting the combination of the patches, the difference in density between which is largest. For instance, a latent image patch, which has a density value that is present in the vicinity of a predetermined density value, and a background image patch, which has a density value that is present in the vicinity of a predetermined density value differing from the former predetermined density value, can be selected from a copy, instead of selecting the combination of the patches, the difference indensity between which is largest.

Thus, the adjustment of the density of the copy-forgery-inhibited pattern image is finished. The copy-forgery-inhibited pattern image, which is generated after performing this method, uses these density signal values.

According to the second embodiment, an appropriate density signal value, which is used to generate a copy-forgery-inhibited pattern image, can surely and automatically be determined to output the copy-forgery-inhibited pattern image having high visualizability (the difference between the reflection density value of a latent image part on a copy and the reflection density value of a background part thereon is large).

Third Embodiment

A third embodiment of the present invention aims at surely and automatically determining an appropriate density signal value, which is used to generate a copy-forgery-inhibited pattern image, to output the copy-forgery-inhibited pattern image that has high visualizability (the difference between the reflection density value of a latent image part on a copy and the reflection density value of a background part thereon is large) and that also has high latent-image concealability.

The first and essential half of a process to be performed by the third embodiment is described below in detail with reference to the flowchart shown in FIG. 32.

Figure 32:
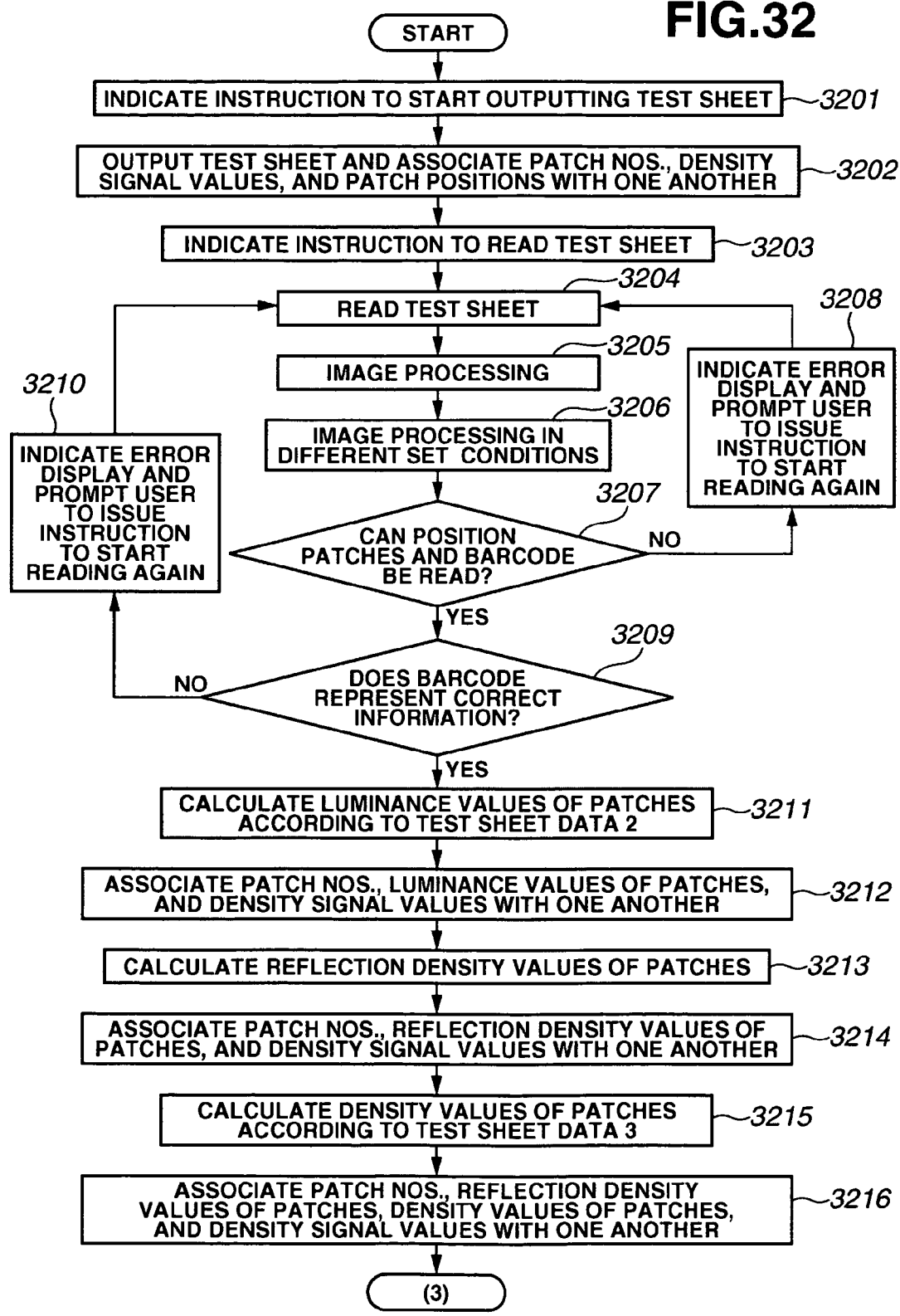
FIG. 32 is another flowchart illustrating the second half of the density adjustment method.

According to the process illustrated in the flowchart shown in FIG. 32, first, the test sheet data 2 (image data representing an image that is close to an image of a test sheet) and the test sheet data 3 (image data representing an image that is close to an image of a copy of the test sheet) are generated. Subsequently, the luminance value of each patch on the image represented by this test sheet data 2 is obtained. Then, the reflection density value of each patch is obtained by utilizing a luminance-reflection-density table. Subsequently, the density value of each patch on the image represented by the test sheet data 3 is obtained. Then, the information on each patch is associated with the information on the density value and the reflection density value.

Hereinafter, the first half of the flow of the process of adjusting the density of the copy-forgery-inhibited pattern image will be described by focusing attention on the difference between FIG. 32 (the third embodiment) and FIG. 16 (the first embodiment). Step 1605 shown in FIG. 16 differs from steps 3205 and 3206 shown in FIG. 32. Additionally, steps 3215 and 3216 shown in FIG. 32 are newly added to the process of the third embodiment.

First, the difference between processing performed in step 1605 and processing performed in steps 3205 and 3206 will be described below. In step 1605, the test sheet data 2 is generated and is stored in the RAM 302. In contrast, in steps 3205 and 3206, the test sheet data 2 and the test sheet data 3 are generated and are stored in the RAM 302.

Next, processing performed in steps 3215 and 3216 are described below. In step 3215, according to a method similar to the method according to the second embodiment, the density value of each patch is obtained by estimating the reflection density thereof on a copy from the test sheet data 3. In step 3216, the density values obtained in step 3215 are associated with the patch numbers in the table shown in FIG. 22, which is generated according to the test sheet data 2. Thus, a table shown in FIG. 33 is generated. Incidentally, in the table shown in FIG. 33, patch numbers, patch density values corresponding to the reflection density values on a copy, patch reflection density values corresponding to the reflection density on an original, and density signal values, which are used when the test sheet is generated, are associated with one another.

Density Signal Value Determination Method

Figure 34:
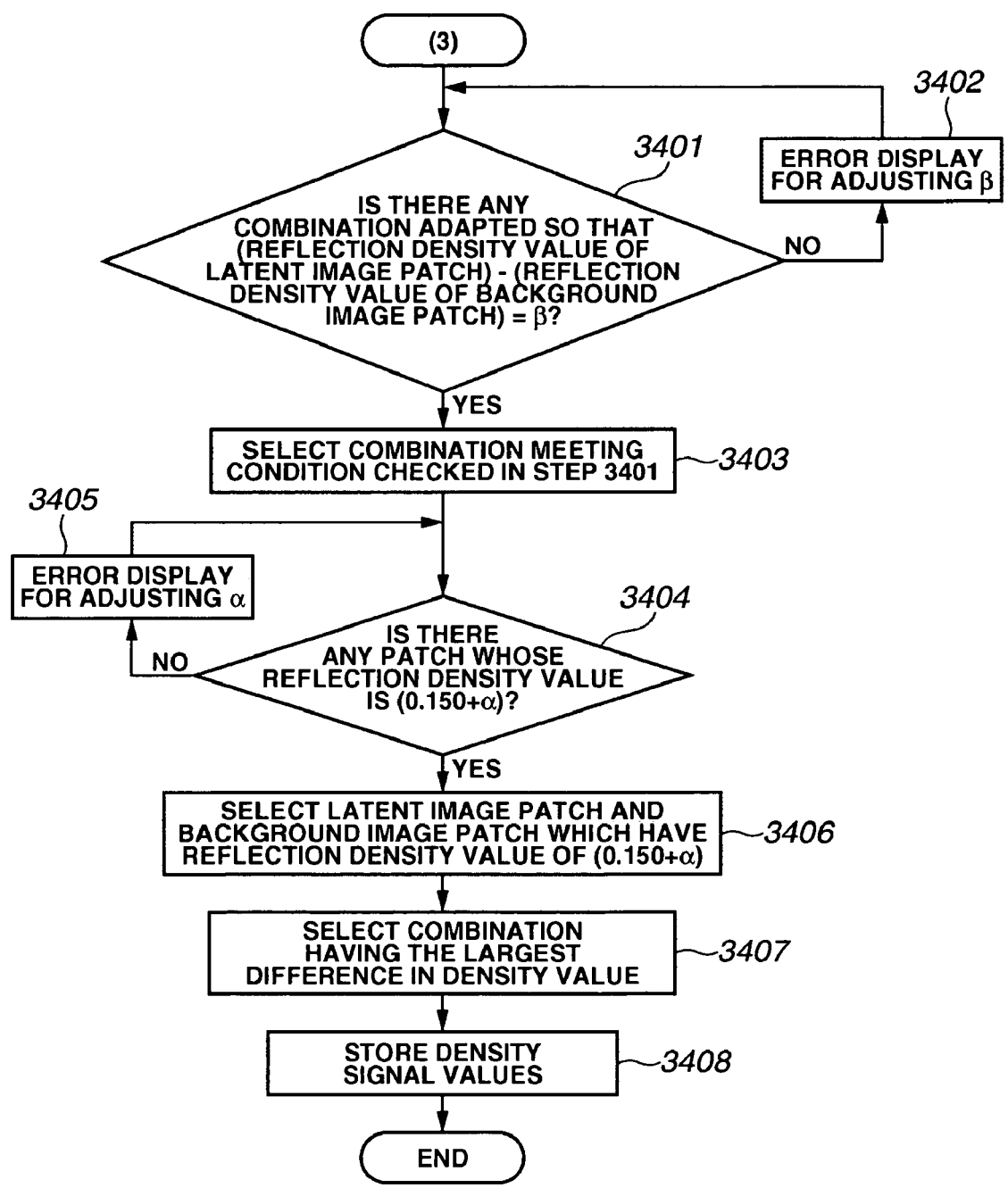
FIG. 34 is a flowchart illustrating the second half of another density adjustment method.

Next, a density signal value determination method according to the present embodiment will be described below by referring to FIG. 34. This method is to surely and automatically determine an appropriate density signal value, which is used to generate a copy-forgery-inhibited pattern image, so as to output a copy-forgery-inhibited pattern image that has high visualizability (the difference between the reflection density value of a latent image part on a copy and the reflection density value of a background part thereon is large) and that also has high latent-image concealability.

In step 3401, it is judged by referring to the table shown in FIG. 33 whether there is a combination of patches set so that (the reflection density value of a latent image patch) −(the reflection density value of a background image patch) =$\beta$(−0.005≦$\beta$≦0.005). In the judgment, the difference between the reflection density value of each of the latent image patches and that of each of the background image patches is compared with $\beta$. If there is such a combination, this process proceeds to step 3403. If not, the process advances to step 3402. Incidentally, the range of the difference ($\beta$) between the reflection density value of the latent image patch and that of the background image patch is not limited to the aforementioned range.

In step 3402, an error display is indicated on the operation screen. Simultaneously, an indication used to prompt the user to adjust the difference $\beta$ is displayed thereon. When the user performs the adjustment of the difference $\beta$ and subsequently depresses the start key (not shown), the process returns to step 3401.

In step 3403, a patch meeting the condition tested in step 3401 is selected.

In step S3404, it is judged by referring to the table shown in FIG. 33 whether a latent image patch and a background image patch each of which has a reflection density value of 0.150+$\alpha$ ($\alpha$ is equal to or more than −0.01 and is equal to or less than 0.01) are present among the patches selected in step 3403. In the judgment, the difference between the reflection density value of each of the latent image patches and the background image patches and the value of 0.150 is compared with the value $\alpha$. Incidentally, this value $\alpha$ can be changed by a user through the operation unit 12. If it is judged that such a latent image patch and such a background image patch are present, this process advances to step 3406. If it is judged that such a latent image patch and such a background image patch are absent, this process proceeds to step 3405.

In step 3405, an error display is indicated on the operation screen. Simultaneously, an indication used to prompt the user to adjust the value $\alpha$ is displayed thereon. When the user performs the adjustment of the value $\alpha$ and subsequently depresses the start key (not shown), the process returns to step 3404.

Subsequently, in step 3406, a patch meeting the condition tested in step 3404 is selected.

Subsequently, in step 3407, a combination of the patches, the difference in density value between which is largest, is selected by referring to the table shown in FIG. 33 from the patches selected in step 3406.

Subsequently, in step 3408, the density signal values corresponding to the selected latent image patch and the selected background image patch are stored in the HDD 304.

Thus, the adjustment of the density of the copy-forgery-inhibited pattern image is finished. The copy-forgery-inhibited pattern image, which is generated after performing this method, uses these density signal values.

According to the present density determination method, an appropriate density signal value, which is used to generate a copy-forgery-inhibited pattern image, can surely and automatically be determined to output a copy-forgery-inhibited pattern image that has high visualizability (the difference between the reflection density value of a latent image part on a copy and the reflection density value of a background part thereon is large) and that also has high latent-image concealability.

Fourth Embodiment

A fourth embodiment of the present invention aims at adjusting the density of a copy-forgery-inhibited pattern image generated by an image forming apparatus (the apparatus 30) that has no scanner unit. Thus, the present embodiment performs processing by using this image forming apparatus (the apparatus 30), which cooperates with another image forming apparatus (the apparatus 10) having a scanner unit.

As stated above, the apparatus 10 and the apparatus 30 are network-connected to each other. It is assumed that the apparatus 10 can instruct the apparatus 30 through a network to print, and that the apparatus 10 can instruct the apparatus 30 to register the density signal value.

Method of Adjusting Density of Copy-Forgery-Inhibited Pattern Image

Figure 35:
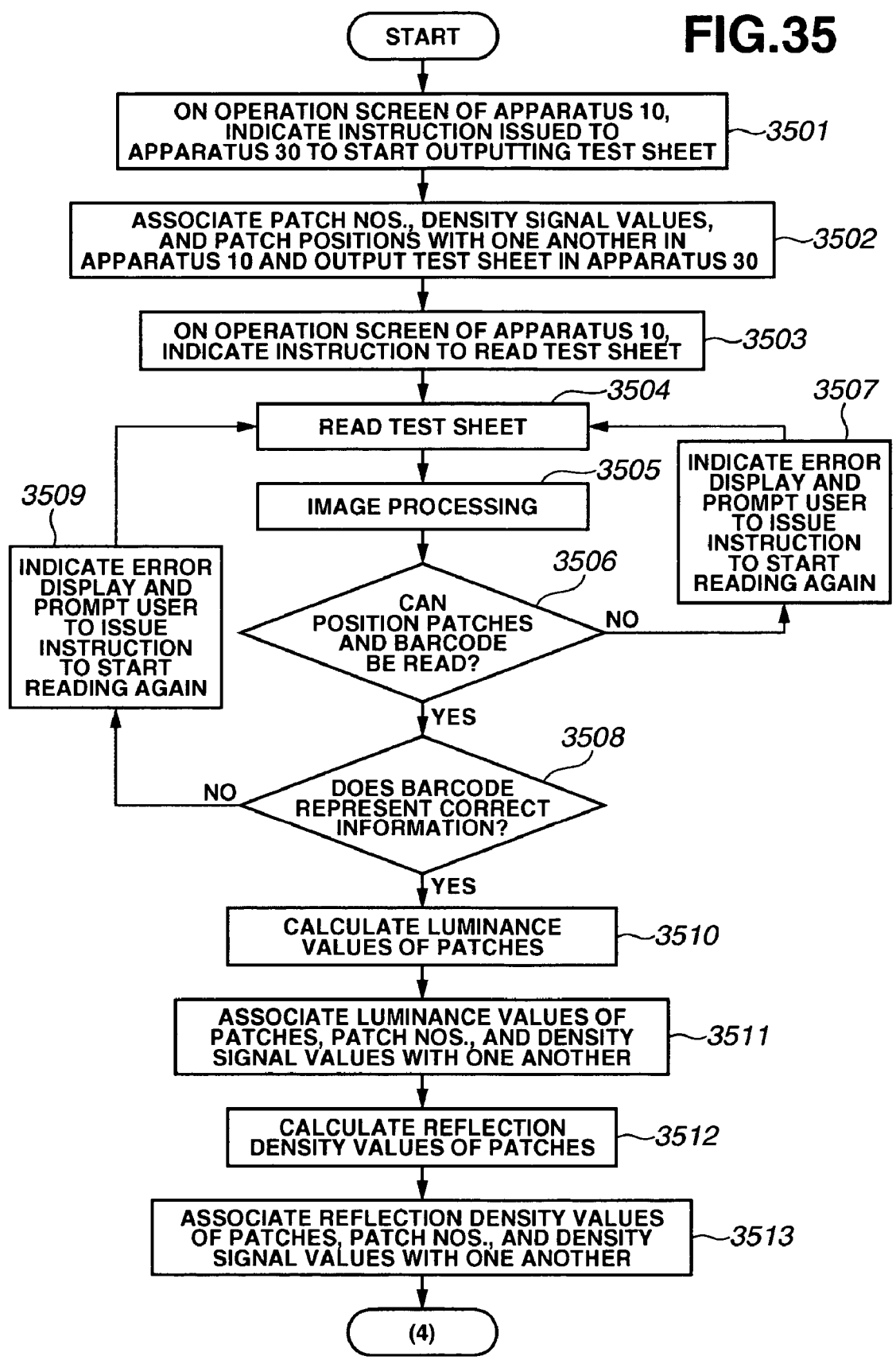
FIG. 35 is a flowchart illustrating the first half of the density adjustment method.

The first half of a process of adjusting the density of a copy-forgery-inhibited pattern image according to the present embodiment will be described below with reference to FIG. 35.

Figure 36:
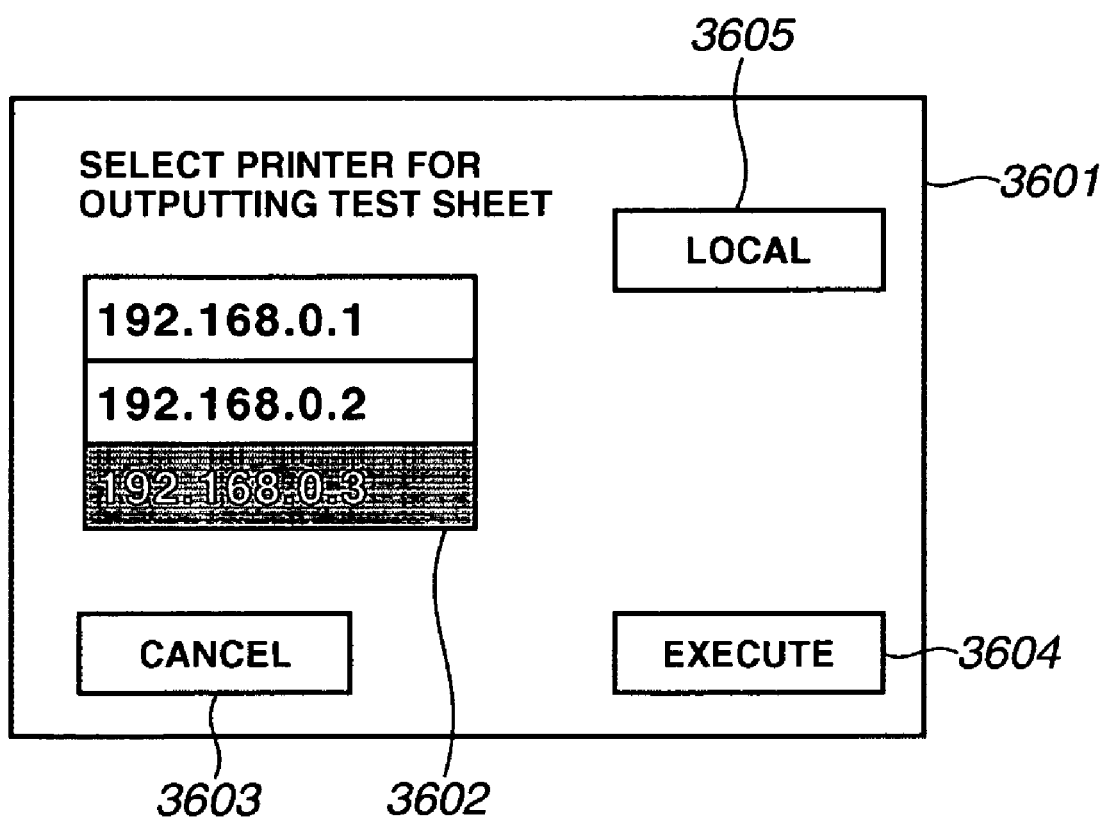
FIG. 36 is an explanatory diagram illustrating a test sheet output printer selection screen.

In step 3501, a screen display shown in FIG. 36 is indicated on the operation screen of the apparatus 10. Reference numeral 3601 designates a screen adapted to select a printer for outputting a test sheet. A printer selection tab 3602 is used to select a printer that outputs a test sheet. When this printer selection tab 3602 is depressed, the display is reversed. Then, the image forming apparatus for outputting a test sheet is selected. As shown in FIG. 36, the image forming apparatus (the apparatus 30), whose address is 192.168.0.3, is selected. A "cancel" tab 3603 is used to cancel the outputting of a test sheet. An "execute" tab 3604 is used to instruct the start of outputting a test sheet. A "local" tab 3605 is used to instruct its own machine (the apparatus 10) to start outputting a test sheet. When the "execute" tab 3604 is depressed in the current state (the state in which the apparatus 30 is selected), the process proceeds to step 3502.

In step 3502, a table shown in FIG. 19 is generated. Then, the start of outputting of a test sheet is instructed to the apparatus 30. When receiving such an instruction, the apparatus 30 outputs the test sheet. Upon completion of outputting the test sheet, the apparatus 30 informs the apparatus 10 of termination of outputting the test sheet. Then, the process proceeds to step 3503.

Figure 37:
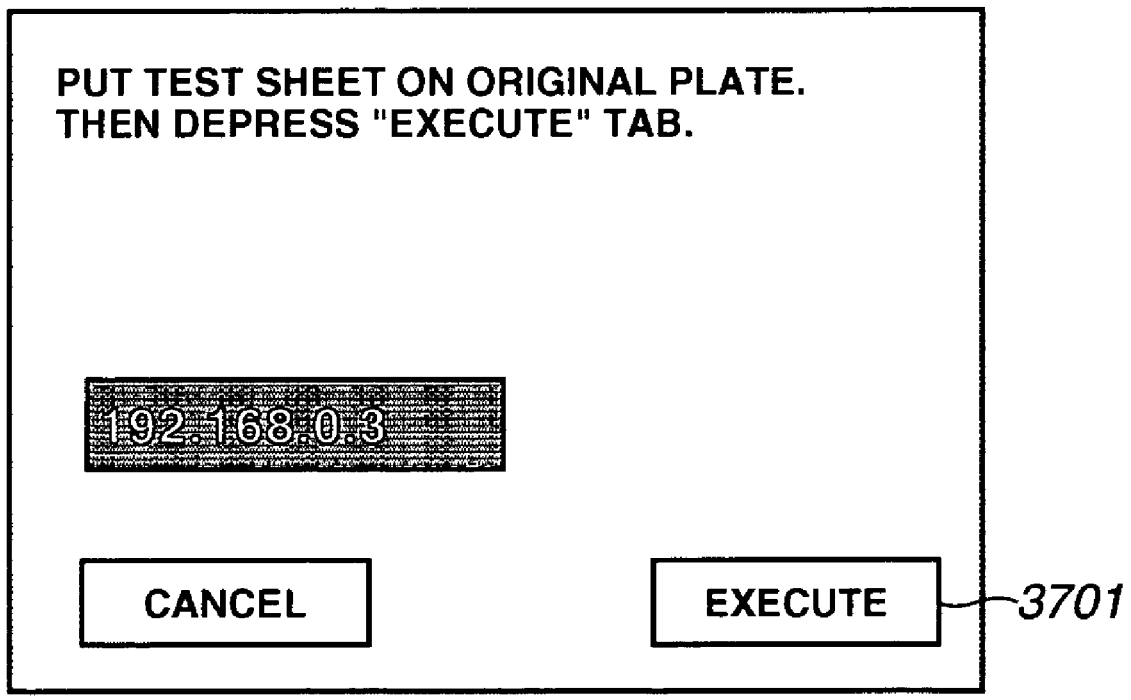
FIG. 37 is an explanatory diagram illustrating a test sheet read screen.
Figure 38:
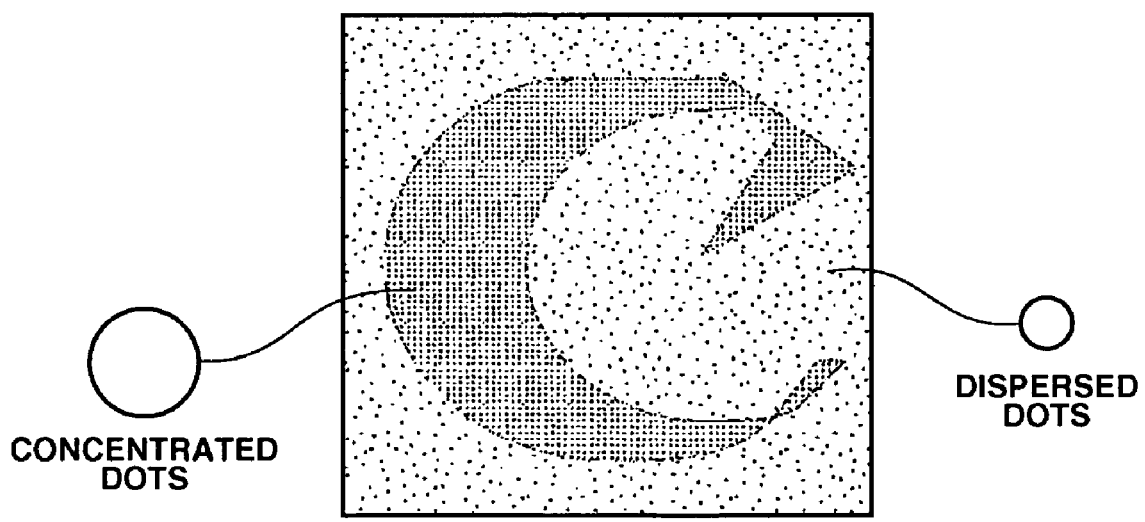
FIG. 38 is a diagram illustrating the state of dots in a copy-forgery-inhibited pattern image.
Figure 39A:
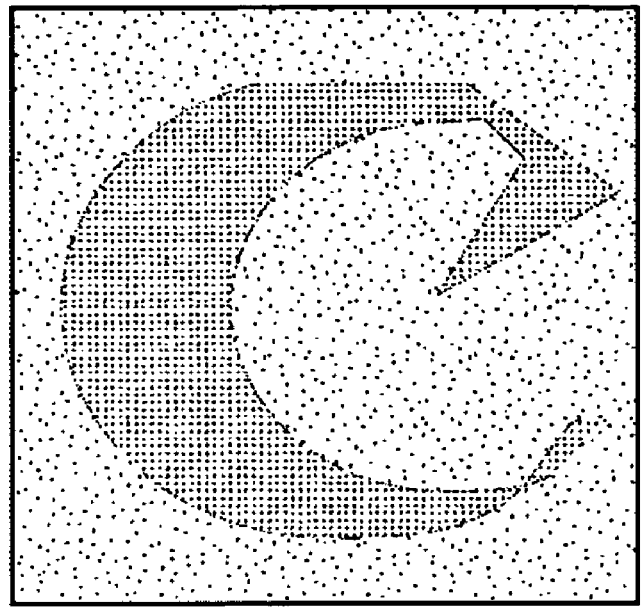
FIGS. 39A and 39B are diagrams illustrating visualization.
Figure 39B:
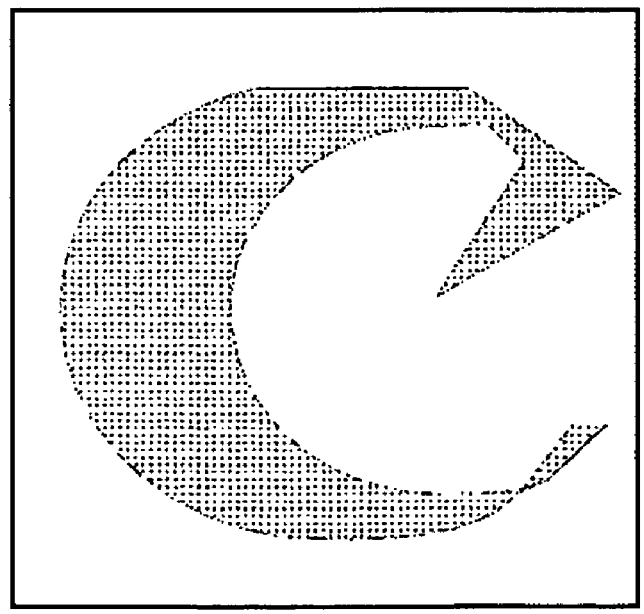

In step 3503, a display shown in FIG. 37 is indicated on the operation screen of the apparatus 10. When the "execute" tab 3701 is depressed after a test sheet is placed on the original table of the apparatus 10, the process proceeds to step 3504.

In step 3504, the apparatus 10 starts reading the placed test sheet.

Processing performed in steps 3505 to 3513 is similar to that performed in steps 1605 to 1613 shown in FIG. 16. The processing in steps 3505 to 3513 is performed in the apparatus 10.

Density Signal Value Determination Method

Subsequently, a process of determining a density signal value is started in the apparatus 10. All of the density signal value determination methods described in the foregoing description of the first embodiment can be applied to the density signal value determination method according to the present embodiment. The density signal value determination method according to the present embodiment differs from the density signal value determination method according to the first embodiment in the following respects.

In the present embodiment, after an appropriate density signal value is determined in the apparatus 10, the determined density signal value is transmitted from the apparatus 10 to the apparatus 30. Also, the determined density signal value is stored in the HDD of the apparatus 30.

Thus, the adjustment of the density of the copy-forgery-inhibited pattern image is completed.

Although it has been described that the processing corresponding to the processing performed in the first embodiment is performed by the cooperation between the apparatus 10 and the apparatus 30, the manner of performing such processing according to the present invention is not limited thereto. For example, the processing corresponding to the processing performed in the second or third embodiment can be performed by the cooperation between the apparatus 10 and the apparatus 30.

According to the fourth embodiment, even in the image processing apparatus having no image reading unit, a density signal value, which is appropriate for outputting a copy-forgery-inhibited pattern image, can surely and automatically be determined.

The foregoing first to third embodiments have described the density adjustment method of adjusting the density of the copy-forgery-inhibited pattern image so as to synthesize image data from the original image data obtained by scanning and the copy-forgery-inhibited pattern image. The density adjustment method, to which the present invention is applied, is not limited thereto. For instance, the present invention can be applied to the case where the density of a copy-forgery-inhibited pattern image used together with original image data generated in the PC 40 to synthesize image data is adjusted.

In this case, it is assumed that there are two cases of storing data representing the result of density adjustment (an appropriate density signal value), that is, one case where this data representing the appropriate density signal value is stored in the apparatus 10, and the other case where this data representing the appropriate density signal value is stored in the PC 40. Hereinafter, the density adjustment method in each of these cases is briefly described below.

In the case where the data representing the density signal value is stored in the apparatus 10, the methods of adjusting the density of the copy-forgery-inhibited pattern image, which are described in the description of the first to third embodiments, can be applied. Incidentally, it is necessary to display the indications (for examples, in steps 1601, 1607, and 1609 shown in FIG. 16) in the PC 40. Also, it is necessary to appropriately transmit information between the PC 40 and the apparatus 10.

On the other hand, in the case where the data representing the result of the density adjustment is stored in the PC 40, the methods of adjusting the density of the copy-forgery-inhibited pattern image, which are described in the description of the first to third embodiments, can be applied. Incidentally, it is necessary to display the indications (for examples, in step 2302 shown in FIG. 23) in the PC 40. Thus, even in this case, it is necessary to appropriately transmit information between the PC 40 and the apparatus 10.

Also, the present invention can be applied to a system including a plurality of units (for example, a computer, an interface unit, a reader, a printer, and so forth) and also can be applied to a system constituted by one unit (that is, a multifunction machine, a printer, and a facsimile apparatus).

The features and the advantages of the present invention are also obtained by causing a computer (or a CPU or an MPU) to read program code from a recording medium, which stores the program code capable of implementing the procedure described in the foregoing description of the embodiments, and to execute the program code. In this case, the program code itself read out from the recording medium implements the functions of the aforementioned embodiments. Thus, this program code and the recording medium, which stores this program code, constitute the present invention.

For example, a floppy (registered trademark) disk, a hard disk, an optical disk, a magneto-optical disk, a CD-ROM, a CD-R, a magnetic tape, a nonvolatile memory card, a ROM, and the like can be used as the recording medium for supplying the program code.

The functions of the aforementioned embodiments can be implemented not only by executing the program code read by the computer but by performing a part or all of actual processes by an OS (Operating System) running on the computer according to instructions of the program code.

The functions of the aforementioned embodiments can be implemented by performing a part or all of actual processes by a CPU or the like provided on a functional expansion board, which is inserted into a computer, or in a functional expansion unit, which is connected to the computer, after the program code read from the recording medium is written in a memory of the functional expansion board or unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-192017 filed Jun. 30, 2005, which is hereby incorporated by reference herein in its entirety.

What is claimed is:

1. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information presenting luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit determines a density signal value that is used to generate a latent image, and a density signal value that is used to generate a background image, by selecting one of the plurality of latent image patches, which has luminance information representing a luminance value closest to a predetermined value, and one of the plurality of background image patches, which has luminance information representing a luminance value closest to the predetermined value, according to the luminance information representing luminance values of the plurality of latent image patches and the plurality of background image patches obtained by the luminance information obtaining unit.

2. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information presenting luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit determines a density signal value that is used to generate a latent image, and a density signal value that is used to generate a background image, by selecting one of the plurality of latent image patches, which has luminance information representing a luminance value closest to a predetermined value, and one of the plurality of background image patches, which has luminance information representing a luminance value closest to the luminance value represented by the luminance information of the selected latent image patch, according to the luminance information representing luminance values of the plurality of latent image patches and the plurality of background image patches obtained by the luminance information obtaining unit.

3. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information presenting luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit determines a density signal value that is used to generate a latent image, and a density signal value that is used to generate a background image, by selecting one of the plurality of background image patches, which has luminance information representing a luminance value closest to a predetermined value, and one of the plurality of latent image patches, which has luminance information representing a luminance value closest to the luminance value represented by the luminance information of the selected background image patch, according to the luminance information representing luminance values of the plurality of latent image patches and the plurality of background image patches obtained by the luminance information obtaining unit.

4. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information representing luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit determines a density signal value that is used to generate a latent image, and a density signal value that is used to generate a background image, by selecting latent image patches and background image patches, each of which has luminance information representing a luminance value in the vicinity of a predetermined value, and further selecting a combination of the latent image patch and the background image patch, the difference in luminance value between which is smallest, from the selected latent image patches and background image patches, according to the luminance information representing luminance values of the plurality of latent image patches and the plurality of background image patches obtained by the luminance information obtaining unit.

5. An image forming apparatus configured to form a copy-forgery-inhibited pattern image, which includes a latent image and a background image, on a sheet, the image forming apparatus comprising:
   a formation unit configured to form a plurality of latent image patches, which are generated by using a plurality of density signal values, and a plurality of background image patches, which are generated by using a plurality of density signal values, on at least one sheet;
   a luminance information obtaining unit configured to obtain luminance information representing luminance values of the plurality of latent image patches and the plurality of background image patches in image data obtained by reading the sheet on which the plurality of latent image patches and the plurality of background image patches are formed; and
   a determination unit configured to determine a density signal value that is used to generate a latent image, and a density signal value that is used to generate a background image, according to the luminance information obtained by the luminance information obtaining unit,
   wherein the determination unit determines a density signal value that is used to generate a latent image, and a density signal value that is used to generate a background image, by selecting combinations of the latent image patch and the background image patch, the difference value in luminance value between which is equal to or less than a predetermined value, and further selecting a combination of the latent image patch and the background image patch, the luminance value of each of which is closest to a predetermined value, from the selected combinations, according to the luminance information representing luminance values of the plurality of latent image patches and the plurality of background image patches obtained by the luminance information obtaining unit.

6. An image forming apparatus configured to form a copy-forgery-inhibited pattern image, which includes a latent image and a background image, on a sheet, the image forming apparatus comprising:
   a formation unit configured to form a plurality of latent image patches, which are generated by using a plurality of density signal values, and a plurality of background image patches, which are generated by using a plurality of density signal values, on at least one sheet;
   a luminance information obtaining unit configured to obtain luminance information representing luminance values of the plurality of latent image patches and the plurality of background image patches in image data obtained by reading the sheet on which the plurality of latent image patches and the plurality of background image patches are formed; and
   a determination unit configured to determine a density signal value that is used to generate a latent image, and a density signal value that is used to generate a background image, according to the luminance information obtained by the luminance information obtaining unit,
   wherein the determination unit generates reflection density information by performing luminance-reflection-density conversion process on the luminance information obtained by the luminance information obtaining unit, and determines a density signal value that is used to generate a latent image, and a density signal value that is used to generate a background image, according to the generated reflection density information, and
   wherein the determination unit determines a density signal value that is used to generate a latent image, and a density signal value that is used to generate a background image, by selecting one of the plurality of latent image patches, which has the reflection density information representing a reflection density closest to a predetermined value, and one of the plurality of background image patches, which has the reflection density information representing a reflection density closest to the predetermined value, according to the generated reflection density information representing reflection densities of the plurality of latent image patches and the plurality of background image patches.

7. An image forming apparatus configured to form a copy-forgery-inhibited pattern image, which includes a latent image and a background image, on a sheet, the image forming apparatus comprising:
   a formation unit configured to form a plurality of latent image patches, which are generated by using a plurality of density signal values, and a plurality of background image patches, which are generated by using a plurality of density signal values, on at least one sheet;
   a luminance information obtaining unit configured to obtain luminance information representing luminance values of the plurality of latent image patches and the plurality of background image patches in image data obtained by reading the sheet on which the plurality of latent image patches and the plurality of background image patches are formed; and
   a determination unit configured to determine a density signal value that is used to generate a latent image, and a density signal value that is used to generate a background image, according to the luminance information obtained by the luminance information obtaining unit,
   wherein the determination unit generates reflection density information by performing luminance-reflection-density conversion process on the luminance information obtained by the luminance information obtaining unit, and determines a density signal value that is used to generate a latent image, and a density signal value that is used to generate a background image, according to the generated reflection density information, and
   wherein the determination unit determines a density signal value that is used to generate a latent image, and a density signal value that is used to generate a background image, by selecting one of the plurality of latent image patches, which has the reflection density information representing a reflection density closest to a predetermined value, and one of the plurality of background image patches, which has the reflection density information representing a reflection density closest to the reflection density represented by the reflection density information of the selected latent image patch, according to the generated reflection density information representing reflection densities of the plurality of latent image patches and the plurality of background image patches.

8. An image forming apparatus configured to form a copy-forgery-inhibited pattern image, which includes a latent image and a background image, on a sheet, the image forming apparatus comprising:
   a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information representing luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit generates reflection density information by performing luminance-reflection-density conversion process on the luminance information obtained by the luminance information obtaining unit, and determines a density signal value that is used to generate a latent image, and a density signal value that is used to generate a background image, according to the generated reflection density information, and wherein the determination unit determines a density signal value that is used to generate a latent image, and a density signal value that is used to generate a background image, by selecting one of the plurality of background image patches, which has the reflection density information representing a reflection density closest to a predetermined value, and one of the plurality of latent image patches, which has the reflection density information representing a reflection density closest to the reflection density represented by the reflection density information of the selected background image patch, according to the generated reflection density information representing reflection densities of the plurality of latent image patches and the plurality of background image patches.

9. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information representing luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit generates reflection density information by performing luminance-reflection-density conversion process on the luminance information obtained by the luminance information obtaining unit, and determines a density signal value that is used to generate a latent image, and a density signal value that is used to generate a background image, according to the generated reflection density information, and wherein the determination unit determines a density signal value that is used to generate a latent image, and a density signal value that is used to generate a background image, by selecting latent image patches and background image patches, each of which has the reflection density information representing a reflection density in the vicinity of a predetermined value, and further selecting a combination of the latent image patch and the ground image patch, the difference in reflection density between which is smallest, according to the generated reflection density information representing reflection densities of the plurality of latent image patches and the plurality of background image patches.

10. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a luminance information obtaining unit configured to obtain luminance information representing luminance values of the plurality of latent image patches and the plurality of background image patches in image data obtained by reading the sheet on which the plurality of latent image patches and the plurality of background image patches are formed; and a determination unit configured to determine a density signal value that is used to generate a latent image, and a density signal value that is used to generate a background image, according to the luminance information obtained by the luminance information obtaining unit, wherein the determination unit generates reflection density information by performing luminance-reflection-density conversion process on the luminance information obtained by the luminance information obtaining unit, and determines a density signal value that is used to generate a latent image, and a density signal value that is used to generate a background image, according to the generated reflection density information, and wherein the determination unit determines a density signal value that is used to generate a latent image, and a density signal value that is used to generate a background image, by selecting combinations of the latent image patch and the background image patch, the difference in reflection density represented by the reflection density information between which is equal to or less than a predetermined value, and further selecting a combination of the latent image patch and the background image patch, each of which has the reflection density information representing a reflection density closest to a predetermined value, from the selected combinations, according to the generated reflection density information representing reflection densities of the plurality of latent image patches and the plurality of background image patches.

11. An image forming apparatus configured to form a copy-forgery-inhibited pattern image, which includes a latent image and a background image, on a sheet, the image forming apparatus comprising:

a formation unit configured to form a plurality of latent image patches, which are generated by using a plurality of density signal values, and a plurality of background image patches, which are generated by using a plurality of density signal values, on at least one sheet;

a density information obtaining unit configured to, according to image data generated by performing a predetermined image processing operation on image data obtained by reading the sheet on which the plurality of latent image patches and the plurality of background image patches are formed, obtain density information representing density values of the plurality of latent image patches and the plurality of background image patches in the image data; and a determination unit configured to determine a density signal value that is used to generate a latent image, and a density signal value that is used to generate a background image, according to the density information obtained by the density information obtaining unit, wherein the determination unit determines a density signal value that is used to generate a latent image, and a density signal value that is used to generate a background image, by selecting a combination of the latent image patch and the background image patch, the difference in density value represented by the density information between which is largest, according to the density information representing density values of the plurality of latent image patches and the plurality of background image patches obtained by the density information obtaining unit.

\* \* \* \* \*